(12) United States Patent
Elson

(10) Patent No.: US 11,727,904 B2
(45) Date of Patent: *Aug. 15, 2023

(54) NETWORK MUSICAL INSTRUMENT

(71) Applicant: VoiceLessons, Inc., Rancho Cucamonga, CA (US)

(72) Inventor: Michael John Elson, Wylie, TX (US)

(73) Assignee: VoiceLessons, Inc., Rancho Cucamonga, CA (US)

( * ) Notice: Subject to any disclaimer, the term of this patent is extended or adjusted under 35 U.S.C. 154(b) by 24 days.

This patent is subject to a terminal disclaimer.

(21) Appl. No.: 17/301,097

(22) Filed: Mar. 24, 2021

(65) Prior Publication Data

US 2022/0044661 A1 Feb. 10, 2022

Related U.S. Application Data

(63) Continuation of application No. 16/553,023, filed on Aug. 27, 2019, now Pat. No. 10,964,298, which is a
(Continued)

(51) Int. Cl.
*G10H 1/20* (2006.01)
*G10H 1/00* (2006.01)
(Continued)

(52) U.S. Cl.
CPC ........... *G10H 1/0008* (2013.01); *G09B 15/00* (2013.01); *G10H 1/0033* (2013.01); *G10H 1/20* (2013.01);
(Continued)

(58) Field of Classification Search
CPC .. G10H 1/0066; G10H 1/0025; G10H 1/0008; G10H 1/0058; G10H 1/00;
(Continued)

(56) References Cited

U.S. PATENT DOCUMENTS 6,069,310 A * 5/2000 James .................. G10H 1/0066
84/645
6,192,340 B1 2/2001 Abecassis
(Continued)

FOREIGN PATENT DOCUMENTS

CN 107705776 A * 2/2018
EP 211573281 3/2015
(Continued)

OTHER PUBLICATIONS

PCT Search Report and Written Opinion dated Apr. 10, 2018 regarding PCT/US2017/066521, 18 pp.

*Primary Examiner* — Marlon T Fletcher
(74) *Attorney, Agent, or Firm* — Knobbe, Martens, Olson & Bear LLP

(57) ABSTRACT

Methods and systems are described that are utilized for remotely controlling a musical instrument. A first digital record comprising musical instrument digital commands from a first electronic instrument for a first item of music is accessed. The first digital record is transmitted over a network using a network interface to a remote, second electronic instrument for playback to a first user. Optionally, video data is streamed to a display device of a user while the first digital record is played back by the second electronic instrument. A key change command is transmitted over the network using the network interface to the second electronic instrument to cause the second electronic instrument to playback the first digital record for the first item of music in accordance with the key change command. The key change command may be transmitted during the streaming of the video data.

29 Claims, 18 Drawing Sheets

Related U.S. Application Data continuation of application No. 16/008,776, filed on Jun. 14, 2018, now Pat. No. 10,410,614, which is a continuation of application No. 15/841,115, filed on Dec. 13, 2017, now Pat. No. 10,008,190.

(60) Provisional application No. 62/434,678, filed on Dec. 15, 2016, provisional application No. 62/514,445, filed on Jun. 2, 2017.

(51) Int. Cl.
| | | |
|---|---|---|
| *G09B 15/00* | (2006.01) | |
| *H04N 7/15* | (2006.01) | |
| *G11B 27/34* | (2006.01) | |
| *H04L 43/0852* | (2022.01) | |
| *H04N 7/14* | (2006.01) | |

(52) U.S. Cl.
CPC .......... *G11B 27/34* (2013.01); *H04L 43/0858* (2013.01); *H04N 7/142* (2013.01); *H04N 7/15* (2013.01); *G10H 2210/066* (2013.01); *G10H 2210/076* (2013.01); *G10H 2210/081* (2013.01); *G10H 2210/091* (2013.01); *G10H 2220/015* (2013.01); *G10H 2220/126* (2013.01); *G10H 2240/016* (2013.01); *G10H 2240/056* (2013.01); *G10H 2240/131* (2013.01); *G10H 2240/171* (2013.01); *G10H 2240/175* (2013.01)

(58) Field of Classification Search
CPC .............. G10H 1/46; G10H 2240/056; G10H 2240/145; G10H 1/365; G10H 2210/081; G10H 2210/111; G10H 2240/311; G10H 2240/175; G10H 1/20; G10H 2220/015; G10H 1/36; G10H 1/368; G10H 2240/305; G10H 1/0033; G10H 2240/171; G10H 2240/271; G10H 2240/275; G10H 2240/301; G10H 2220/011

See application file for complete search history.

(56) References Cited

U.S. PATENT DOCUMENTS

| | | |
|---|---|---|
| 7,129,408 B2 | 10/2006 | Uehara |
| RE42,565 E | 7/2011 | Paepcke |
| 9,817,551 B2 | 11/2017 | Moncavage |
| 9,857,934 B2 | 1/2018 | Humphrey |
| 10,008,190 B1 * | 6/2018 | Elson .................. G10H 1/0033 |
| 10,410,614 B2 | 9/2019 | Elson |
| 10,964,298 B2 * | 3/2021 | Elson ..................... G11B 27/34 |
| 2003/0121401 A1 | 7/2003 | Ito |
| 2003/0164084 A1 | 9/2003 | Redmann |
| 2005/0056141 A1 | 3/2005 | Uehara |
| 2005/0150362 A1 | 7/2005 | Uehara |
| 2006/0112814 A1 | 6/2006 | Paepcke |
| 2006/0123976 A1 * | 6/2006 | Both ................. H04L 12/1822 84/600 |
| 2006/0272483 A1 * | 12/2006 | Honeywell ............... G10F 1/02 84/609 |
| 2007/0039449 A1 * | 2/2007 | Redmann ............. G10H 1/0058 84/609 |
| 2008/0163747 A1 * | 7/2008 | Uehara ................ G10H 1/0058 84/645 |
| 2008/0188967 A1 | 8/2008 | Taub et al. |
| 2008/0190271 A1 | 8/2008 | Taub et al. |
| 2009/0133567 A1 | 5/2009 | Okano |
| 2009/0161585 A1 | 6/2009 | Bicker |
| 2010/0031804 A1 | 2/2010 | Chevreau et al. |
| 2010/0204813 A1 | 8/2010 | Taub et al. |
| 2010/0212478 A1 | 8/2010 | Taub et al. |
| 2010/0218664 A1 | 9/2010 | Toledano et al. |
| 2013/0031220 A1 | 1/2013 | Moncavage |
| 2014/0033900 A1 | 2/2014 | Chapman |
| 2014/0096667 A1 | 4/2014 | Chapman |
| 2014/0260909 A1 | 9/2014 | Matusiak |
| 2015/0046824 A1 | 2/2015 | Humphrey |
| 2015/0348524 A1 | 12/2015 | Skillings |
| 2016/0125861 A1 | 5/2016 | Yamauchi |
| 2016/0125862 A1 | 5/2016 | Takahashi |
| 2018/0174559 A1 * | 6/2018 | Elson ...................... H04N 7/142 |
| 2019/0057677 A1 * | 2/2019 | Elson ........................ H04N 7/15 |
| 2019/0156807 A1 * | 5/2019 | Ryynanen ................ G10H 1/40 |
| 2020/0227013 A1 * | 7/2020 | Elson ........................ H04N 7/15 |
| 2022/0044661 A1 * | 2/2022 | Elson .................. H04L 43/0858 |

FOREIGN PATENT DOCUMENTS

| | | | |
|---|---|---|---|
| JP | 2005-331905 | 12/2005 | |
| JP | 2011-180263 | 9/2011 | |
| WO | WO-2018112260 A1 * | 6/2018 | ............ G09B 15/00 |

* cited by examiner

NETWORK MUSICAL INSTRUMENT

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR 1.57.

BACKGROUND OF THE INVENTION

Field of the Invention

The present invention relates to electronic musical instruments and to transmitting musical information over a network.

Description of the Related Art

Vocal exercises and vocalise are the cornerstones of vocal training for building the human voice. Many voice treatises and singing manuals have been published containing hundreds of vocal exercises. Human voices can be trained by balancing individual vocal instruments through the guided usage of vocal exercises. In voice training there may be a user who possesses a trained ear that can diagnose and direct the vocal organs of the other user by utilizing exercises which control the final vocal product of what is referred to as "the voice". The vocal exercises can direct a student's voice to create new and proper sensations. These new sensations leave impressions in the subconscious mind. After continual practice of thinking and singing the appropriate pitch, vowel, and consonant for the exercise pattern, training the conscious mind to recall the known sensations to respond reflexively and spontaneously improves vocal skills and singing.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

An aspect of the disclosure relates to methods and systems that are utilized for remotely controlling a musical instrument. A first digital record comprising musical instrument digital commands from a first electronic instrument for a first item of music is accessed. The first digital record is transmitted over a network using a network interface to a remote, second electronic instrument for playback to a first user. Video data is optionally streamed to a display device of a user while the first digital record is played back by the second electronic instrument. A key change command is transmitted over the network using the network interface to the second electronic instrument to cause the second electronic instrument to playback the first digital record for the first item of music in accordance with the key change command. The first digital record and key change command may optionally be stored and then transmitted over the network to the second electronic instrument in the same transmission.

An aspect of the disclosure relates to a networked music instrument system, comprising: a network interface; a computing device; non-transitory memory that stores program instructions that, when executed by the computing device, cause the networked music instrument system to perform operations comprising: accessing a first digital record comprising musical instrument digital commands received from a first electronic instrument for a first item of music; transmitting the first digital record over a network using the network interface to a remote, second electronic instrument for playback; conducting a video conference between a first user local to the first electronic instrument and a second user local to the second electronic instrument while the first digital record is played back by the second electronic instrument; detecting a key change command received from the first electronic instrument during the video conference; and transmitting, in real time, the key change command over the network using the network interface to the second electronic instrument and causing the second electronic instrument to playback the first digital record for the first item of music in accordance with the key change command.

An aspect of the disclosure relates to a computer-implemented method, comprising: accessing, by a first computer device comprising hardware, a first digital record, the first digital record comprising musical instrument digital commands from a first electronic instrument for a first item of music; transmitting, by the first computer device, the first digital record over a network using a network interface to a remote, second electronic instrument for playback to a first user; streaming, by the first computer device, video data to a display device of the first user while the first digital record is played back by the second electronic instrument; and transmitting by the first computer device, during the streaming of the video data, a key change command over the network using the network interface to the second electronic instrument to cause the second electronic instrument to playback the first digital record for the first item of music in accordance with the key change command.

An aspect of the disclosure relates to non-transitory memory that stores program instructions that, when executed by a computing device, cause the computing device to perform operations comprising: accessing a first digital record comprising musical instrument digital commands from a first electronic instrument for a first item of music; transmitting the first digital record over a network using a network interface to a remote, second electronic instrument for playback to a first user; streaming, by the first computer device, video and/or audio communication data to a device of the first user for reproduction while the first digital record is played back by the second electronic instrument; transmitting, during the streaming of video and/or audio communication data, a key change command over the network using the network interface to the second electronic instrument and causing the second electronic instrument to playback the first digital record for the first item of music in accordance with the key change command.

An aspect of the disclosure relates to a networked music instrument system, comprising: a network interface; a computing device; and non-transitory memory that stores program instructions that, when executed by the computing device, cause the networked music instrument system to perform operations comprising: accessing a first digital record comprising musical instrument digital commands received from a first electronic instrument for a first item of music; transmitting the first digital record over a network using the network interface to a remote, second electronic instrument for playback; detecting a key change command received from the first electronic instrument; and transmitting (optionally in real time) the key change command over the network using the network interface to the second electronic instrument and causing the second electronic instrument to playback the first digital record for the first item of music in accordance with the key change command.

An aspect of the disclosure relates to a computer-implemented method, comprising: accessing, by a first computer device comprising hardware, a first digital record, the first digital record comprising musical instrument digital commands from a first electronic instrument for a first item of music; transmitting, by the first computer device, the first digital record over a network using a network interface to a remote, second electronic instrument for playback; optionally detecting a key change command received from the first electronic instrument; and transmitting by the first computer device the key change command over the network using the network interface to the second electronic instrument to cause the second electronic instrument to playback the first digital record for the first item of music in accordance with the key change command.

An aspect of the disclosure relates to a non-transitory memory that stores program instructions that, when executed by a computing device, cause the computing device to perform operations comprising: accessing a first digital record comprising musical instrument digital commands from a first electronic instrument for a first item of music; transmitting the first digital record over a network using a network interface to a remote, second electronic instrument for playback to a first user; optionally detecting a key change command; and transmitting the key change command over the network using the network interface to the second electronic instrument and causing the second electronic instrument to playback the first digital record for the first item of music in accordance with the key change command.

Figure 1:
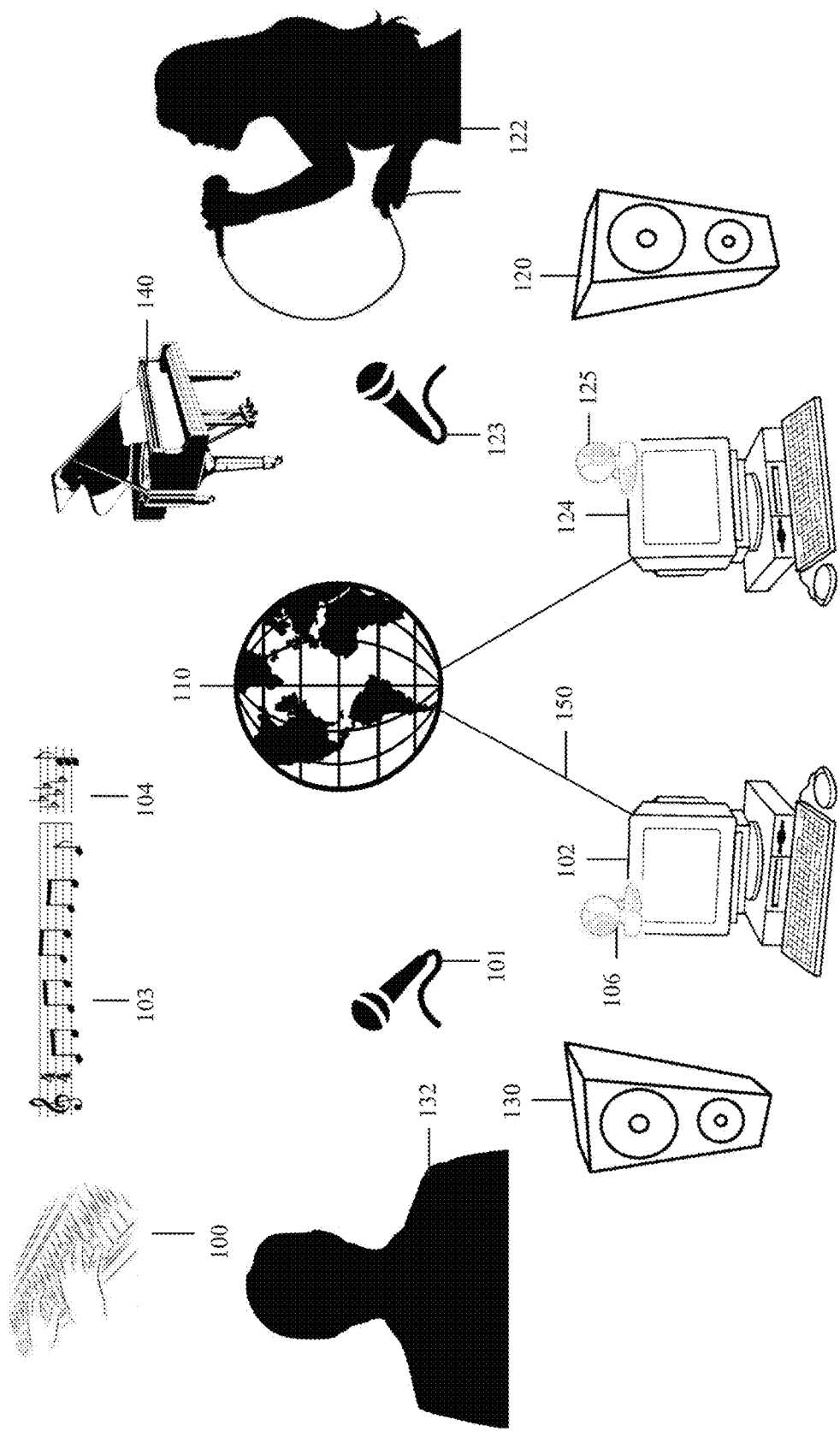
FIG. 1 illustrates an example architecture and environment.

While each of the drawing figures illustrates a particular aspect for purposes of illustrating a clear example, other embodiments may omit, add to, reorder, and/or modify any of the elements shown in the drawing figures. For purposes of illustrating clear examples, one or more figures may be described with reference to one or more other figures, but using the particular arrangement illustrated in the one or more other figures is not required in other embodiments.

DETAILED DESCRIPTION

Described herein are methods and systems for electronic instruments, for synchronizing electronic instruments over a network, and using electronic instruments for instruction.

Attempts have been made to implement long distance vocal training. However, the ability to project and transmit vocal exercises between two physically separate locations becomes severely limited when using a basic telephone, VoIP, or video calls. Delays are introduced when streaming audio over a network, such as a telephone network or the Internet. In particular, delays occur when streaming audio of a first user (e.g., an instructor) playing an instrument (e.g., a piano or keyboard) at a first location, to a remote instrument associated with a second user at a second location, for playback by the second instrument, where the second user is to sing along with the playback by the second instrument as part of a vocal training exercise. Further delays are introduced when streaming the second user's singing back to a first user device for reproduction as discussed in greater detail herein.

Thus, one problem that would be useful to optionally solve is to reduce and eliminate the audio delay experienced when transmitting vocal exercises during real-time voice training, where two users are communicating over the Internet using conventional VoIP services, such as those offered by Skype. Audio delays may be introduced as follows. Two users may each have respective computing devices coupled to respective audio output device (e.g., a speaker or headphones) and to respective microphones. Before playing a vocal exercise, a first user (e.g., an instructor) explains the exercise and optionally may sing a demonstration of the pitches, vowels, and consonants, which may be streamed over a network from the first user computing device to the second user computing device for playback. The first user may then play the musical exercise using a first musical instrument, such as a piano, keyboard, guitar or other instrument.

The streaming audio of the first user's instrument playing is transmitted to the second user's computing device for playback. A first audio delay occurs during such transmission. During playback to the second user by the second user's computing device, the second user hears the streaming audio of the instrument playing of the vocal exercise and sings along with the vocal exercise. The second user's singing is captured by the second user's microphone and streamed to the first user's computing device for playback. During this transmission, the second audio delay occurs. The first user thus hears the second user sing with the combined first and second delays (which may be hundreds of milliseconds or more) after the first user played the vocal exercise on the first instrument. This may cause the first user to attempt to compensate for such delays by playing "ahead of time" or rushing or slowing the playing.

Further, the second user's microphone may pick up the delayed playback of the first user's instrument and transmit the playback to the first user with the second user's singing. This will add to the confusion that may be experienced by the first user when playing the vocal exercise, rendering remote exercise playing over a network using conventional approaches difficult, confusing, and unusable, and may result in an unsuitable musical training session. It would be advantageous to be able to create and project musical exercises over a network without such delays being suffered by the users. In addition, it would be advantageous to enable the first user, as an instructor, to seamlessly make absolute key changes in ascending or descending directions based on the individual needs of the second.

Optional solutions to these and other technical challenges are disclosed herein.

Unless the context indicates otherwise, the term musical instrument may refer to a purely electronic instrument (e.g., a music synthesizer; a digital keyboard; a digital audio workstation (DAW) used for recording, editing and producing audio files, etc.) or an acoustic instrument (e.g., an acoustic piano, guitar, etc.) with a pickup (e.g., a microphone, magnetic pickup, etc.) coupled to an audio-to-musical instrument digital command (e.g., MIDI) converter, or the like.

The disclosed system may be utilized in conjunction with or may include a musical instrument or digital recording thereof. The musical instrument may generate instrument digital commands (e.g., MIDI commands). The digital recording may be in the form of stored instrument digital commands (e.g., MIDI commands) or a digital recording of analog music. The musical instrument may be coupled to a computing device via a wired or wireless interface such as, by way of example, USB, Apple Lightening, Bluetooth, or BLE. The computing device may capture the vocal exercises via the interface (as reflected in the playing of the instrument), and transmit the exercises over a network (e.g., the Internet, a local area network, a wide area network, a personal area network, etc.) to a remote musical instrument for reproduction. Such reproduction may optionally be utilized in the context of voice and singing practice and training.

A first musical instrument, sometimes referred to as herein as a local instrument, may be local to an instructor or other source of training content. The local instrument transmits a signal comprising event data representing the playing of a musical exercise, such as a vocal exercise (e.g., captured in the form of notes and/or chords with durations, intensity/volume, velocities, and timings) to a computing device (sometimes referred to herein as a local receiver), which may be local to the instructor or other source of training content. It is understood that the local instrument and local receiver may be optionally integrated into a single device within the same housing.

A vocal exercise and/or musical accompaniment may include a sequence of notes and/or chords having specific pitch, velocity, volume, and start/end times. The vocal exercise and/or musical accompaniment may include a vocal part, a song segment, an entire song, or another music idea. A given vocal exercise and/or musical accompaniment may optionally include an end chord or transition chord or notes used to signify the absolute key of the next repetition of the exercise, which may remain in the current key or modulate to a new absolute key. Thus, rather than having to record a vocal exercise and/or musical accompaniment in each absolute key, an absolute key change command may be provided by a user (e.g., an instructor) by playing an end chord or transition chord or notes on the local instrument, which will cause the an absolute key change command to be transmitted using the local receiver over a network to a remote instrument associated with another user (e.g., a student), sometimes referred to herein as a remote instrument. The remote instrument may be connected to a computing device (sometimes referred to herein as a remote receiver) via a wired or wireless interface, which may be local to the student or other remote user. It is understood that the remote instrument and remote receiver may be optionally integrated into a single device within the same housing.

When the musical instrument is a MIDI-equipped instrument, the MIDI-equipped instrument may transmit information (e.g., MIDI commands) from the MIDI-equipped instrument to the computing device (e.g., via a USB interface or a 5-pin DIN connector). The local receiver can be coupled to, integrated with, or be in the form of a computing device (e.g., a desktop computer, a laptop computer, a tablet, a smart phone, an embedded computing device) via a wired or wireless interface. By way of example, the computing device may run any operating system, such as Microsoft Windows, MAC OS X, Linux, iOS, Android, Chrome, etc. The computing device may include a Web browser API or plugin that supports external peripheral connections (e.g., to USB, Lightening, BLE, or MIDI ports).

Figure 5:
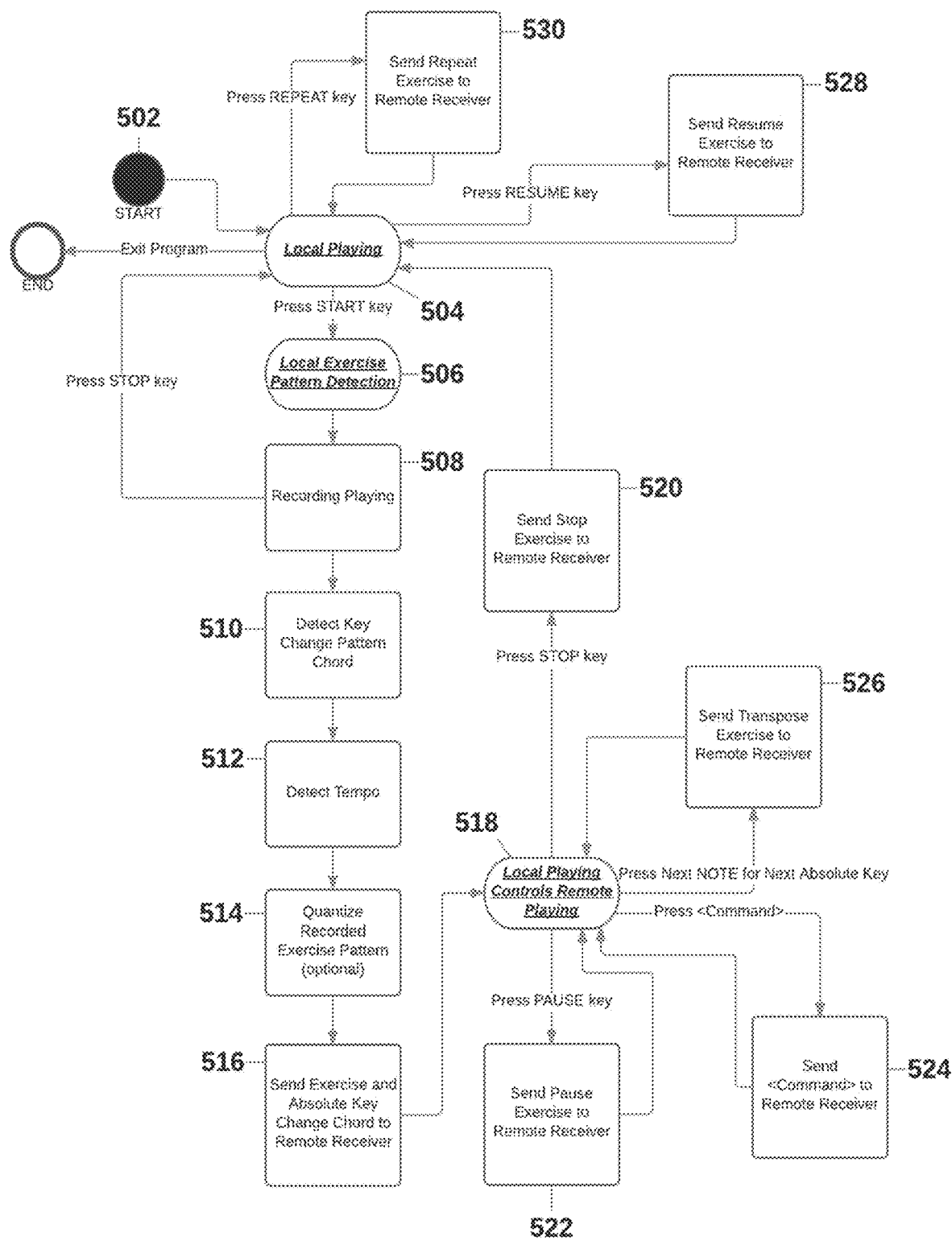
FIG. 5 illustrates an example exercise detection process.

In an embodiment, the local receiver monitors the signals of the musical instrument (e.g., in the form of digital music data packets) in real-time and executes an exercise detection process, such as the example exercise detection process illustrated in FIG. 5, discussed in greater detail herein. The digital packets may be in a format that represents a musical note sequence played using the musical instrument. By way of non-limiting examples, the digital musical packets may formatted as MIDI packets, MusicXML packets, variations thereof, or using a custom protocol or custom format representing the musical note sequence.

The vocal exercises and/or musical accompaniment (collectively referred to as musical content) may be optionally in the form of electronic musical instrument commands (e.g., MIDI or MusicXML (a standard open format for exchanging digital sheet music)) or sound track files (e.g., mp3 or wav) stored in a digital library (e.g., using a cloud based storage system) for future use, and accessed as needed. The vocal exercises and/or musical accompaniment may be associated with and stored with metadata that can be used for searching, filtering, or sorting. For example, if a user is searching for a given type of item of musical content, the user can enter search terms into a search field, and a search engine may search for musical content that has matching metadata.

A library user interface may be provided via which a user can select musical content from a library of musical content. The selected musical content may be utilized as a musical accompaniment, or used to command and play an electronic instrument, thereby simulating live playing of the musical instrument. For example, the selected musical content may be transmitted from the local receiver (or a cloud system hosting the musical content) over a network to the remote instrument (e.g., via the remote computing device) to play the musical accompaniment.

As described in greater detail elsewhere herein, after execution of an exercise detection process (e.g., which may be executed or accessed by the local receiver to capture the vocal exercise patterns and absolute key change patterns from the first user's instrument), the local receiver may transmit one or more digital instrument commands to the remote instrument of the second user. The remote instrument may respond to the digital instrument command(s) by beginning the playing of the commanded musical pattern.

The local receiver may continue to monitor the output of the local instrument of the first user for any further instrument commands (e.g., key change, transpose, auto-up transposition direction, auto-down transposition direction, pause, resume, stop, etc.).

Figure 4:
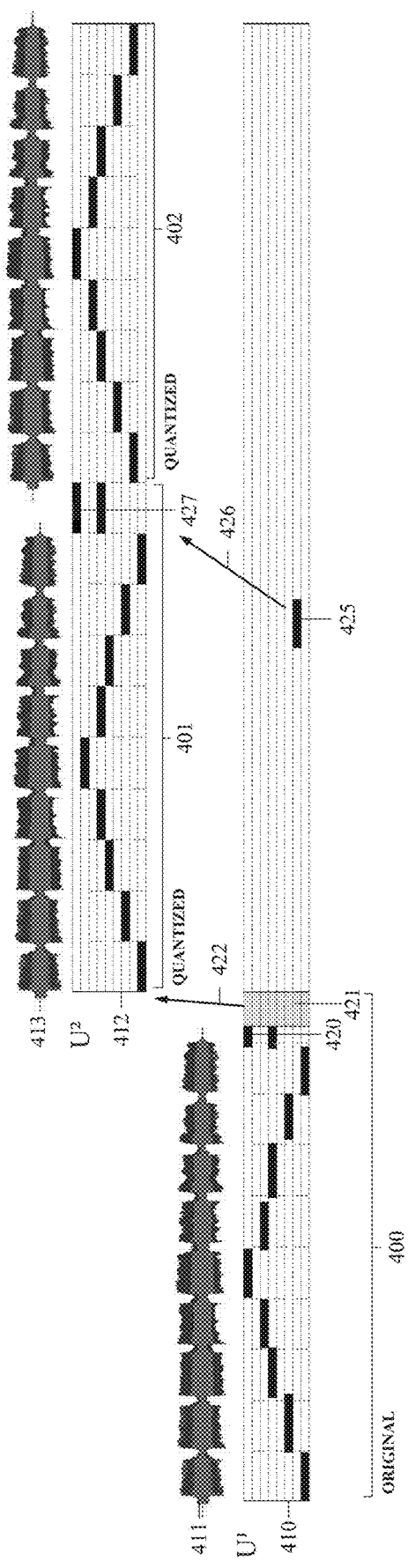
FIG. 4 illustrates an example application of a transpose operation.

By way of example, FIG. 4, discussed elsewhere herein, illustrates an horizontal passage of time where the captured musical pattern is transmitted from the local instrument to the remote instrument, and the timing of the final chord to the beginning of the playing is optionally transmitted with a calculated or estimated time of flight so that the music stays in rhythm and tempo when transmitted from the local instrument for playback on the remote instrument. The system may optionally implement one or more methods or techniques to synchronize the playing between the local instrument and the remote instrument. Optionally, one method may synchronize a time clock on the local receiver and a time clock on the remote receiver and transmit from one receiver to the other receiver periodic timestamp updates, optionally at a regular interval, to keep both time clocks in sync.

Before the musical pattern is transmitted from the local instrument to the remote instrument, an absolute timestamp may be calculated specifying the precise moment to begin playing the first note of the musical pattern on the remote instrument. The time stamp may be the time at the precise local time converted to UTC (e.g., yyyyMMdd HH:mm:ss.ffffffZ format). The local and remote receivers/computers may be synchronized to a time server (e.g., with no greater than 10 ms drift). For example, the instrument signals from the local instrument may be monitored to detect a regular pulse, beat, rhythm and tempo of the musical pattern. The next pulse may then be converted into an absolute timestamp for the playing of the first beat on the remote instrument. In the case where the remote receiver receives the musical pattern after the absolute timestamp due to network delay or congestion, the remote receiver may be configured to begin playing the first beat immediately.

Another optional synchronization technique may be utilized where an absolute timestamp is set, corresponding to the moment the musical pattern is transmitted to the remote instrument, and a relative delay is determined, where the relative delay is to transpire before the remote instrument starts to play the next beat or pulse on the remote instrument. For example, the delay may be calculated as follows:

> Relative Delay=(absolute timestamp of an absolute key change chord)+(the detected pulse time)−(the starting transmission absolute timestamp).

When the remote receiver receives the message, the remote receiver calculates the difference between when the message is transmitted (as reflected by the starting transmission absolute timestamp) and when the message is received (e.g., using a local clock) to obtain the transmission time. The remote receiver may then subtract the determined transmission time from the Relative Delay before the next beat or pulse begins. The remote receiver may then wait until the Relative Delay minus transmission time has elapsed before playing the remote instrument.

Optionally, an approximated calculation may be generated and used to account for the audio delay of the local instrument being transduced and heard by the remote second user. Such calculation may also be incorporated to give the perception to second user that the pulse and beat is not interrupted as it shifts between sources of sound, from the transduced sound of the local instrument to the sound of the remote instrument. As discussed with respect to FIG. 4, the passage of time, at 421, 451, 481, indicates how the absolute key change chord is detected before the ending of the note, allowing a passage of time for transmission which enables the remote receiver to delay playing the musical pattern on the remote instrument until precisely the moment when it should begin to play to keep the rhythm and tempo the same.

There may be advantages and disadvantages to the various techniques that may be used to overcome network delays or congestion and the system may optionally use some or all of the techniques to provide the greatest success rate for playing the remote instrument in rhythm. The time of flight accounts for the capture time, local processing, transmission over the network, receiving time, remote processing, and remote playing in such a manner as to create an imperceptible replication of the musical pattern to keep the pulse, beat, rhythm, and tempo as near to the original on the local instrument. Thus, when the second user listens to the transmission over the audio from the first user, the second user can rely on the same tempo and rhythm continuing. Additionally, as the various instrument commands are identified, they may be optionally transmitted immediately without delay, without a human perceptible delay, or with a small delay.

As noted above, the second user, the remote instrument, and the remote receiver, are at the remote location. Upon receiving a command from the remote receiver (which in turn received the command from the local receiver), the remote instrument, which may be a computing device acting as a synthesizer or coupled to a digital keyboard, piano, guitar or other instrument, carries out the playing of the vocal exercise pattern in the note sequence (e.g., Do, Re, Mi, Fa, Sol, Fa, Mi, Re, Do), in numerical form (e.g., 1-2-3-4-5-4-3-2-1), or in numerous other musical patterns in the original tempo and starting in the absolute key played by the first user. The system may optionally introduce the playing with a metronome (e.g., tick-tock sound), count in (e.g., ready-set-go or ready-1-2-3), or lead-in playing (e.g., play the last one or two beats, measure, or portion of the pattern) on the remote computing device or instrument to aid the second user in understanding the key and tempo before the second user starts to sing along. Thus, when the second user commences singing along with the accompaniment, the singing is in rhythm with the accompaniment.

A user interface may be provided enabling the user to enable or disable the playing of an introduction, select the type of introduction playing (e.g., metronome, count in, lead-in playing, etc.), and set the number of beats to play during the introduction. The vocal exercise pattern may optionally be set, via the user interface, to repeat a specified number of times (and then stop playing) or continue to repeat until stopped via a user stop instruction. Optionally, the system provides the first user, via a user interface, the ability to specify the number of iterations to repeat each absolute key in an ascending and/or descending direction.

A manual mode may optionally be provided. In the manual mode, when the exercise plays in the original key and loops (replays) continually on the second user's instrument, the system may enable the first user to specify (e.g., by pressing a keyboard key) a starting note of the next absolute key on the first instrument, which may then be transmitted in conjunction with a transpose command from the local receiver to the remote receiver. The remote receiver may command the remote instrument to transpose and play the exercise using the new absolute key.

An automated mode may optionally be provided. In the automated mode, the system enables the first user (e.g., an instructor) to control, via a user interface, the automatic musical exercise transposition direction, such as auto-up or auto-down. In the auto-up mode, the system will play the remote instrument of the second user (e.g., a student) in the original key, and after each repetition of the musical pattern, increase the absolute key (e.g., by a semitone). In the auto-down mode, the system acts in a similar manner as in auto-up mode, but the absolute key of the repetitions is decreased (e.g., by a semitone) for each iteration. In either the auto-up or auto-down mode, the system enables the first user to send subsequent instrument commands to control the playing of the remote instrument of the second user, such as, by way of example, stop, pause, resume, or restart.

The system optionally provides a user interface via which the first user can specify an increment step size for the auto-up mode and/or a decrement step size for the auto-down mode. There may also be a default step size that may be utilized if there is no user-specified step size. The increment and decrement step sizes may be the same or may be different. The step size may be a semitone, or may be greater or smaller than a semitone (e.g., whole-tone, two semitones, etc.). The auto-up increment step size may be referred to as the ascending interval. The auto-down decrement step size may be referred to as the descending interval.

The system also optionally enables the user to set a range for the automated mode. For example, in the context of a keyboard, the system enables the user to specify the range by pressing two keyboard note keys at the same time which sets the top absolute key to the highest note pressed and the bottom absolute key to the lowest note pressed.

When the system operates in the automated playing mode (e.g., auto-up or auto-down), and a range command has been initiated and transmitted to the remote receiver/remote instrument, then the remote instrument will play the musical pattern in either auto-up or auto-down until the range boundary key (the highest note or lowest note respectively) is reached. When the highest note of the range boundary is reached during auto-play, the system optionally switches the mode from auto-up to auto-down, and instead of incrementing by the ascending interval it will begin decrementing by the descending interval. Similarly, when the lowest note is reached during auto-plat, the system switches from auto-down to auto-up and will begin incrementing by the ascending interval so it continues looping and reverse at the boundary key until a subsequent instrument command is played (e.g., stop, pause).

Furthermore, the system optionally provides a user interface enabling the user to enable or disable such reversal at the boundary key. If such reversal is disabled, then the remote instrument automatically stops playing upon reaching the boundary key.

The system may optionally enable the first user to specify via, a user interface, a default auto-play direction so that when later exercises are transmitted to the remote instrument during an auto-play mode session associated with a range command, the session may be initiated using the default auto-play direction. Optionally, rather than using a default auto-play direction, the exercise may be played using the last used auto-play direction.

A currently playing indicator may be provided for display to indicate the current location, progress, current time, and/or overall time of the musical accompaniment. The currently playing indicator may be implemented in a variety of formats such as a vertical line that scrolls horizontally over musical notation to show the beat within the measure; a highlight of the current measure, bar, or staff being playing; an animated highlight of currently playing or about to play notes; a horizontal line which highlights a percentage of progress and displays the current location by measure number or relative seconds from the beginning optionally including the seconds to the end; and/or other format which can illustrate a location in the music notation currently playing.

During the playing of the musical accompaniment on the local and remote instruments, the system may optionally synchronize the music notation currently playing indicators displayed on both local and remote receivers/instruments, in traditional music score format, in modern pitch notation, and/or other music notation. The currently playing indicator on the remote side is kept in synchronization with the local side music notation so that the first user may follow along with second user in the music notation, and both users can visually see where they are in the score.

However, synchronization poses challenges as the distance over a remote network may introduce problems such as delay, latency, or other network issues which may not exist in a local network and which may require additional techniques to resolve. The system may optionally perform synchronization of the currently playing indicators, using relative timestamps on the local side based on an exact or variable delay time, which can be updated during the playing with an audio stream on the remote side to accommodate any network latency or delay.

The system may optionally perform synchronization of the currently playing indicators using an absolute timestamp on the local and remote sides to keep the currently playing music indicator at an exact or variable delay which can be updated during the playing with the audio stream to keep the music notation indicators in synchronization with the audio stream. The system may optionally perform synchronization where the currently playing music indicator progress is transmitted over as instructions (e.g., move to next bar, start at beginning, go to bar #, playing measure number, etc.) to animate and move any music notes or to highlight bars or other parts of musical notation.

The commands are transmitted from one receiver to the other receiver over a network optionally using the fixed or variable time delay so that the remote side (e.g., the remote receiver/instrument of the remote user) can experience the optional audio and video stream along with synchronized and optionally animated music notation indicators for presentation to the remote user in real-time. Optionally, the system keeps the visual indicators in the local and remote locations in synchronization so that the musical identifier, such as note, bar, current measure, staff, key, section, or other musical identifier, maybe be highlighted or emphasized using a visual indicator (e.g., color animation, graphic, hovering bar line, and/or other visual indicator) while the musical accompaniment is playing in the remote location. This further assists the second user in singing or playing along with a musical exercise. The second user's singing and/or playing may be converted to a digital format and streamed to the local receiver for reproduction to the first user.

Figure 9:
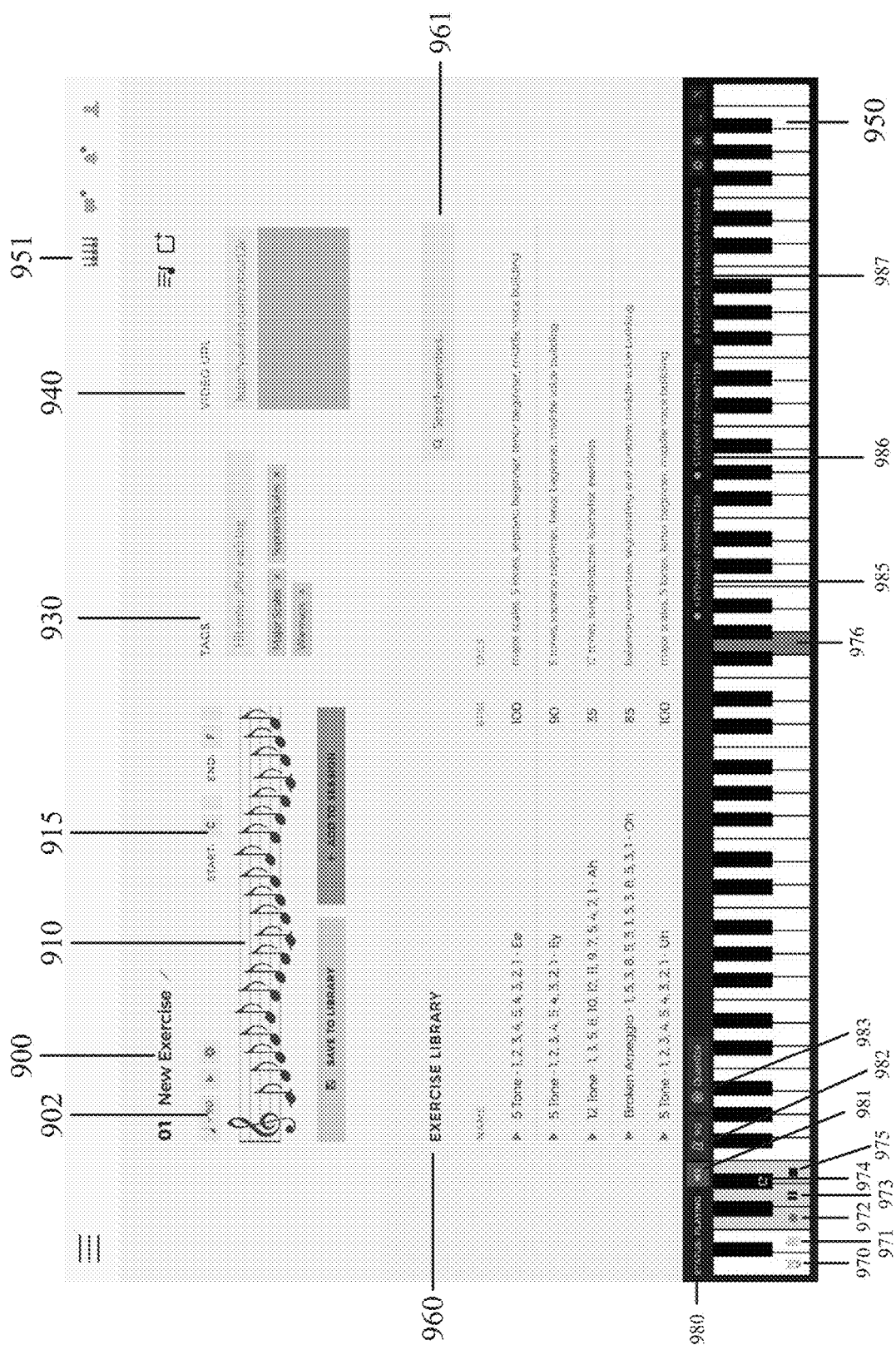
FIG. 9 illustrates an example library user interface.

The system may optionally provide a user interface, an example of which is illustrated in FIG. 9 (discussed in greater detail elsewhere herein), to create exercises and/or musical accompaniments to be stored in a library or session record. The library may enable the stored exercises and/or musical accompaniments to be accessed for immediate use or future use in real-time live sessions, non-real-time sessions, other online training formats (e.g., digital courses or webinars), and/or offline training, where exercises and/or musical accompaniments may be downloaded and stored locally on a user's computing device for use in a training session.

Figure 10:
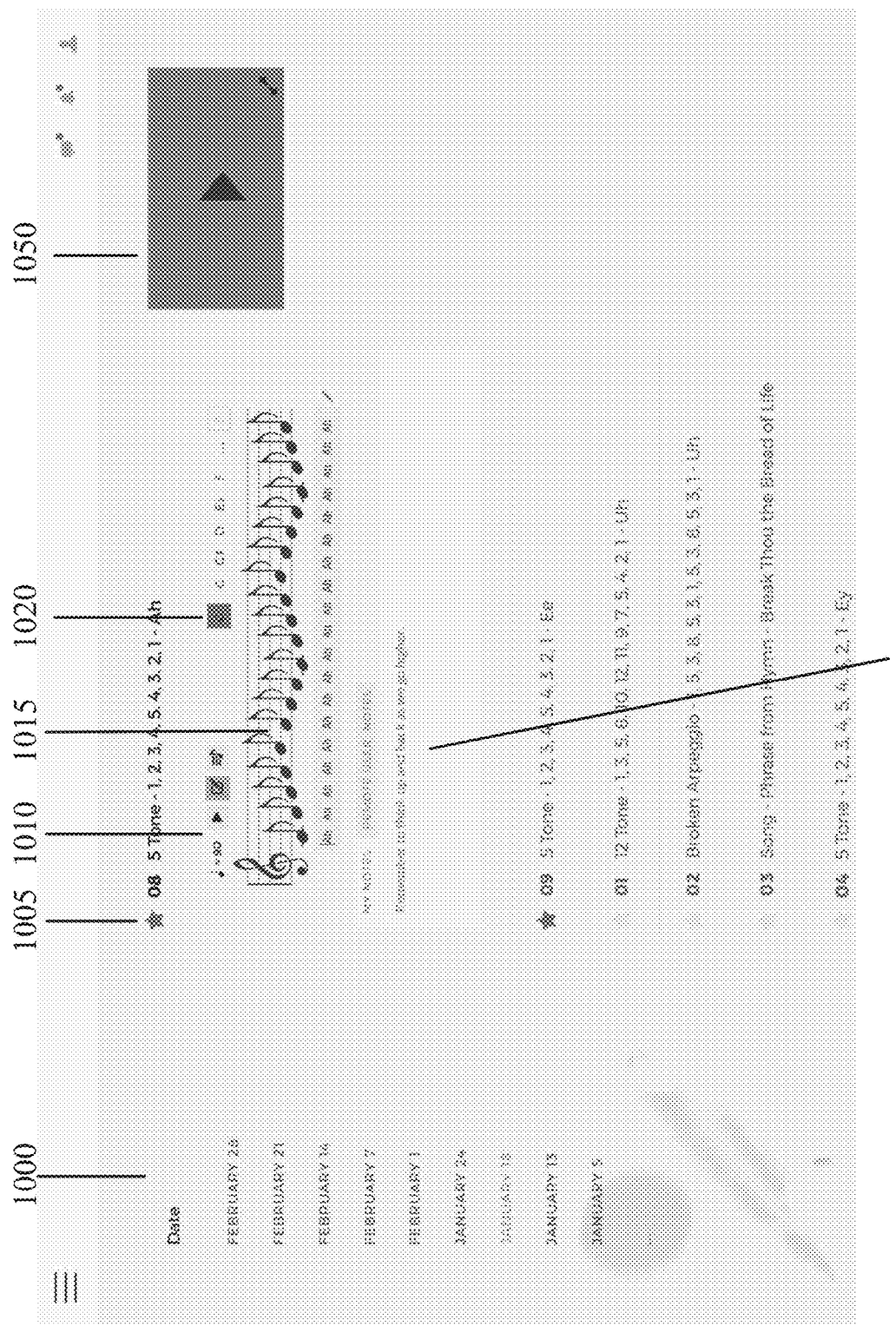
FIG. 10 illustrates an example session history user interface.

The system may optionally store the vocal exercises and/or musical accompaniment recordings from the users during the live sessions or via a user interface within a music library using an interface, an example of which is illustrated in FIG. 10, discussed in greater detail elsewhere herein. For example, the user interface may display a session history of stored exercises that were recorded during several session dates. The system optionally provides a music library of stored musical instrument recordings (e.g., in the form of electronic music commands and/or in the form of a digital recording of analog music) which can be selected for future playing via a user interface.

Figure 11:
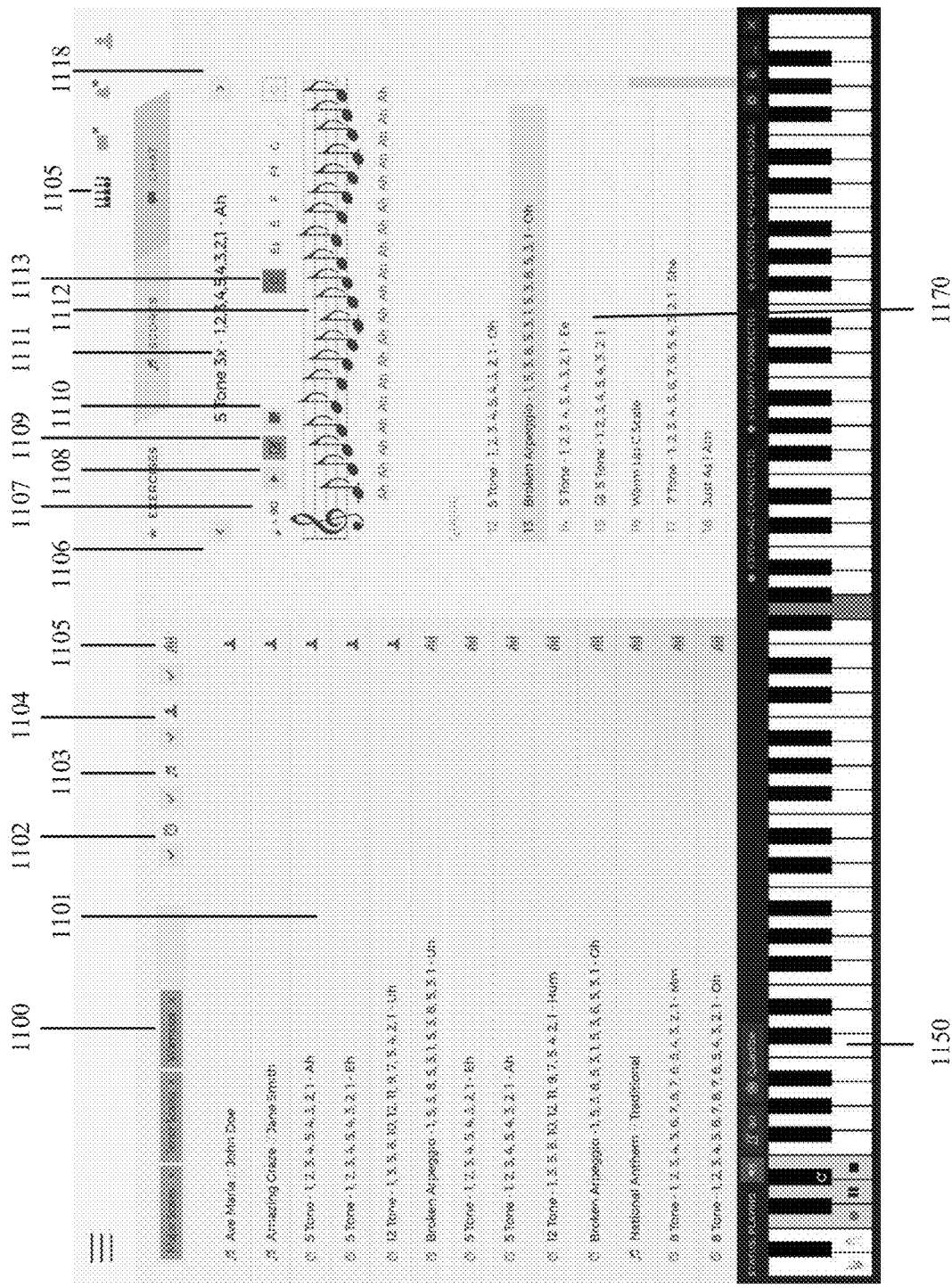
FIG. 11 illustrates an example library user interface.

A library view user interface, an example of which is illustrated in FIG. 11 (discussed elsewhere herein), may be presented (e.g., before or during a session). From the library view user interface, the user can optionally select exercises with and without musical accompaniments, songs with and without musical notation, and/or scores stored in the library. The system may provide automated or human reviewed assessments of usage to make recommendations for other vocal exercises and musical accompaniments within the user interface.

Figure 12:
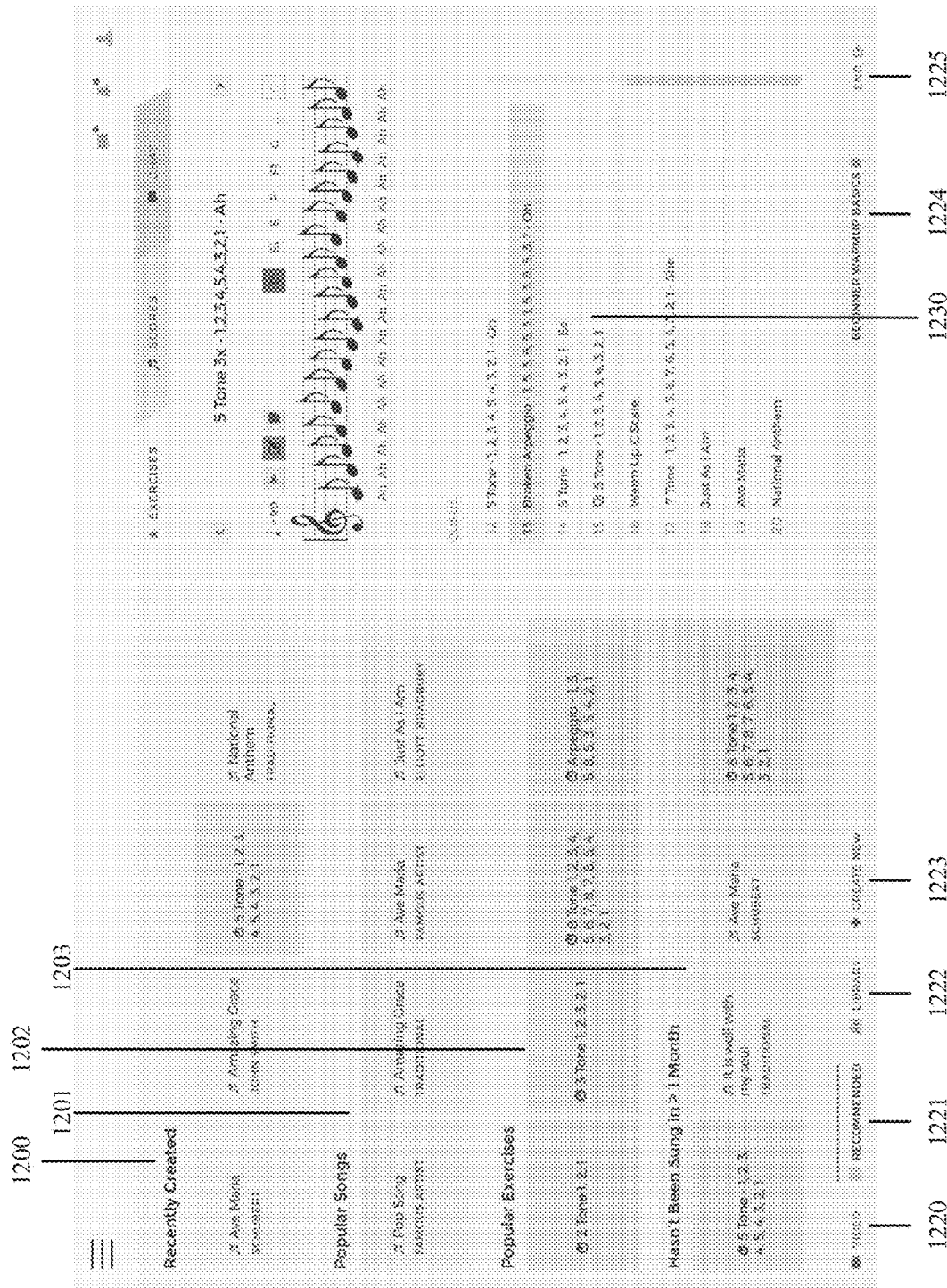
FIG. 12 illustrates an example recommendation user interface.

A recommendation view user interface, an example of which is illustrated in FIG. 12 (discussed in greater detail elsewhere herein), may be provided that displays recommended musical items, which may include and/or be based on recent used musical items, popular songs or exercises, and frequently or infrequently used items based on past usage. The user interface may enable users to select from the recommended vocal exercises and/or musical accompaniments, which the system can play via the local and/or remote instruments. Optionally, a preview control may be provided in association with a library item, which when activated, automatically plays back a portion of the item (e.g., an initial 30 seconds, or representative excerpts). The recommendations may be generated based on usage frequency and/or newness (e.g., never played before, newly added), genre, voice type, specific vocal problem area, vocal concept, and/or other criteria.

The system may optionally implement a "virtual trainer" mode. The virtual trainer acts as an automated trainer that generates suggestions for a user. The system may optionally implement a "master teacher" mode which acts as an automated or human based teacher trainer to assist music professionals. The system may utilize a machine learning algorithm that combines metadata from a given student with assigned exercises from the teacher to generate new exercises and/or musical accompaniments recommendations. The "master teacher" mode may include feedback and guidance from human voice teachers, vocal coaches, vocal instructors, choral directors, music directors, and/or similar professionals who review and assess vocal skills, talent and usage of the system.

Both trainer modes may utilize an analysis performed by the system of historical usage of the system (e.g., selection and usage of exercises, order of selected patterns, practicing of exercises, feedback from users, and/or recorded exercise or song performance) to generate and provide recommendations to a user. The recommendations may optionally include or be in the form of electronic messages, notes, live interactions, recorded messages in audio and/or video format or via other data transfer.

The recommendations may be selected from existing records, tracks, musical accompaniments, and/or vocal exercise (e.g., stored in the system library). Optionally, the system may generate musical patterns, musical accompaniments, and/or vocal exercises for recommendations, general system usage, live instruction, partially human teacher guided instruction, self-guided usage, and/or usage in singing, vocal training, sight reading, and/or building vocal skills. The musical patterns may optionally be generated using machine learning algorithms that study existing musical patterns and to train neural networks for generating music using supervised, unsupervised, and/or a combination of supervised and unsupervised machine learning. Additionally, neural networks, and/or recurrent neural networks, may be fed external data from sources of existing musical patterns, accompaniments, and vocal exercises for their initial training; as well as being provided with continuous feedback of qualitative and quantitative measurements of user performance, usage frequency, scoring, and/or other metadata to further train the system and to customize the generation of musical patterns for a specific user, groups of users, or the general public. The generated musical patterns may be used in any embodiment of the system.

In addition to teacher training and assistance, the "master teacher" mode may be applied to real-time live online auditions or virtual auditions to facilitate the audition process over a network for selecting singers, performers, or future candidates (e.g., who are located in other places than where an audition is physically being held). The system may generate and/or provide an analysis of the vocal exercises and/or musical accompaniments and their respective absolute key, tempo, order of vocal exercise progression, selection of vocal exercise by specific tag, vocal concept, vocal cause and effect, vocal fault, and/or another qualitative examination.

The system may optionally be used within a voice training certification program or a voice teacher vocal pedagogy training program whereby the usage of the system and analysis of the vocal exercises and/or musical accompaniments can provide information about the quality, accuracy, efficacy, or other qualitative measurement of a user's understanding of the course program, as well as quantitative measurements about the usage and performance of time, duration, and/or practice that can be used to generate a score, grade, or result during or upon completion of the program.

The system may optionally provide users an interface to submit a recording (e.g., a video and/or audio recording), of the singer. The system may optionally provide a history of the user's vocal exercises to a review and analysis process whereby other voice teachers, as part of a formal review process (e.g., university, college, certification) or an anonymous review process (e.g., crowd sourced, pay-for-service, speakeasy) can listen, provide analysis, and review other analysis and provide feedback, comments, suggestions, create vocal exercises using the system, select vocal exercises from the music library and/or provide other recommendations on how to improve the singer's performance.

Figure 13:
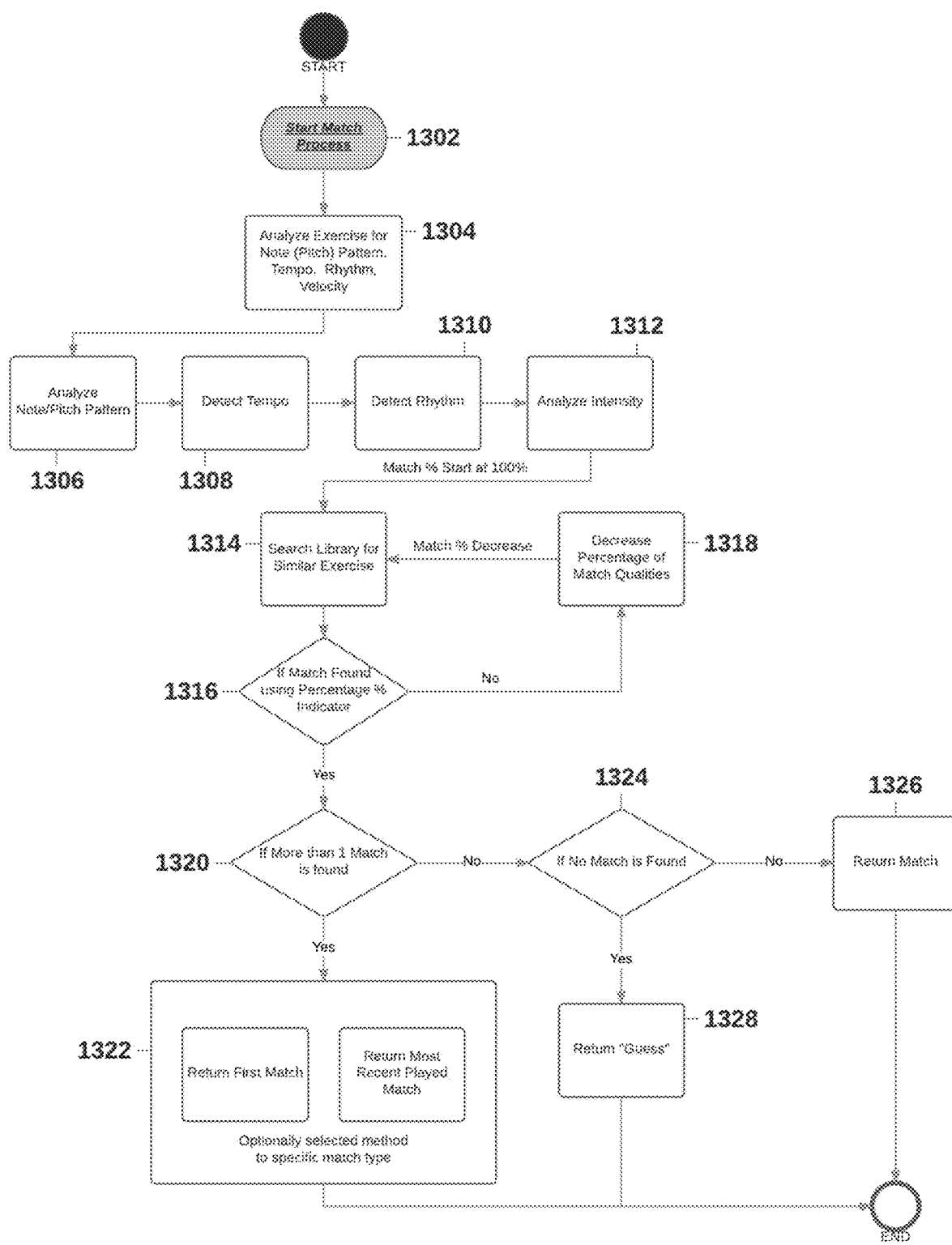
FIG. 13 illustrates an example search and match process.

The system optionally provides an automated library search mechanism to make identifying, naming, and categorizing exercises efficient by eliminating or reducing the chances of a duplicate entry. The system may also implement one or more methods to match exercises by exact note pattern, partial note pattern, or next closest pattern based on similarities like, but not limited to, note pattern, pitch pattern, timing, rhythm, intensity, velocity, intervals, note groupings or musical notation. An example of a search and match process is illustrated in FIG. 13, discussed in greater detail elsewhere herein.

When an exercise is captured via an exercise detection process (an example of which is discussed elsewhere herein), the system may search for an exact or closet matching vocal exercise or musical accompaniment in one or more libraries, based on the playing on the local instrument. If multiple matches are found based on primary or initial criteria, such as absolute or relative musical note pitches, then secondary criteria (e.g., the absolute or relative timestamp of playing of the musical notes) may be further used to identify to matches. If multiple matches are found again, then third criteria may be used in the match identification process, and so on. If no match is found, the system may suggest the closest potential match based on an item having matched some, but not all, criteria and may suggest matches based on recent usage of other exercises by that user or other users of the system.

When a match is identified, the system can then use some or all of the metadata stored in association the matching exercise or musical accompaniment to assign a similarity indication to the newly played captured recording by the local instrument. Examples of metadata include but are not limited to name, key, scale, musical mode (e.g., Major, Minor, Ionian, Xorian, Phrygian, Lydian, Mixolydian, Aeolian, Locrian, etc.); musical notation formatting rules for timing, beaming, grouping, staffing, or position and placement of other musical elements; other identifier (e.g., author, composer, date created, date last used, order last played, commonly played order during session or lesson, date last used with specific users, purpose, description, etc.).

The foregoing search and match process may be utilized to automatically generate a name of a new exercise or musical accompaniment to enable quick identification of the vocal exercise and/or musical pattern and to enable other associated metadata to be easily provided for vocal exercises and/or musical accompaniments.

A match may be identified while searching the exercises for a specific user so that even if the user has renamed the exercise something different like "Diatonic 5 Note Scale" or "1-2-3-4-5-4-3-2-1" to suit the user's own personal preferences the match may be identified. If a user has not provided personalized metadata, then the system may use metadata from the system library. The associated metadata that is merged during the matching process may optionally be displayed via the user interface during live usage or during a historical view of the instrumental play. For example, a very common scale, such as Do-Re-Mi-Fa-So-Fa-Mi-Re-Do, may be played and matched by note pattern, and the name of the exercise may be selected and assigned (e.g., "5 Tone Major Scale").

The system may optionally implement the search and match feature to use only the previously played or stored vocal exercises and/or musical accompaniments of a specific user, group of users, or system-wide library. Where the system performs the search process for a specific user, only that user's set of previously played or stored vocal exercises and/or musical accompaniments are employed during the matching process. Where the system performs the search process for a specific user group, only that group's set of previously played or stored vocal exercises and/or musical accompaniments are utilized during the matching process.

Where the system performs the search process against a system-wide library, optionally the entire set of previously played or stored vocal exercises and/or musical accompaniments for the system-wide library may be utilized during the matching process. Additionally, an optional user interface enables a user or group of users to select or specify specialized searches to find desired metadata maintained in the system-wide library utilizing one or more search request fields.

The system may optionally implement a match and merge process whereby a matched musical accompaniment may be merged to extend a vocal exercise pattern or musical accompaniment. During the search process, a matched vocal exercise and/or musical accompaniment may include additional musical accompaniments in distinct formats, MIDI tracks or files. Where a match contains an additional musical accompaniment, the system may implement a merge process to integrate the matched musical pattern with the captured pattern, creating an exact or very similar matched musical accompaniment while retaining certain key identifying musical characteristics. The identifying musical characteristics may include, by way of example, such attributes as key, tempo, pitch, intensity, velocity, rhythm, harmony, chord progression, chord extension or expansion. The resulting merged musical pattern may be extended with additional chords or musical accompaniment in addition to the captured pattern.

The system optionally implements a song or music library in video, audio, mixed audio/video, or other digital formats (i.e. MIDI, MusicXML, MP3, WAV, MP4, MOV). The music from the library can be played in a similar fashion via the local and remote instrument, where the first user can select the music from the library and control the remote playing on second user's musical instrument. The system optionally provides the first user a user interface with musical player controls such as Play, Pause, Stop, and Fast Forward, that transmits user-selected player commands to the remote instrument, which may be or include a computing device, to play at the remote location. When the remote instrument plays music, sound is transduced via the remote microphone to a digital audio stream and transmitted back to the local receiver of the first user for playback.

The system optionally provides the first user a user interface that enables the first user to set "Jump To Points" (e.g., Starting Point or Rehearsal Letters) that can skip or jump in an item of music to an exact measure number or absolute time in the music (e.g., go to measure number 42, jump to 0:36 seconds) to make the playing of exercises simple and quick without a user having to listen, stop, rewind, etc., in order to locate them. The user interface optionally includes tools to enable a user create, edit, update, and delete the Jump To Points within the music. The Jump To Points can be saved for the specific user, shared with other users, or stored along with music in the individual user's library or a system-wide library. The system optionally displays the Jump To Points for the music to second user.

Optionally, the first user may select, via a user interface, the music and transmit it to the second user receiver/instrument. The system may provide the second user with a player, including controls, such as Play, Pause, Stop, Rewind, Fast Forward, Skip, Rewind 30 seconds, Forward 30 seconds, etc. for playing the music on the second user's instrument. Optionally, the first user may select the music via a user interface and share it with second user and both the first user and second user will be provided with player controls so that either user may control the music playback. Optionally, when a music notation format is provided for display in connection with playing the music, the system may synchronize the music notation indicator so that when it jumps on the display of the first user it also jumps on the display of the second user, and vice versa.

The system optionally enables the first user's local musical instrument to remotely play one or more other network instruments (e.g., associated with students) at the same time, and enables the first user's musical instrument to be used for one-on-one vocal instruction and for group vocal instruction. Optionally, the system enables the first user to play the local instrument and optionally select, via a user interface listing connected remote instruments, one or more of the connected instruments to be played at the same or different times. At the same time, some or all of the users can be connected over a network communication channel enabling audio and/or video communications, in the form of a group video chat. While in group video chat, the first user can optionally mute none, some, or all of the other users (User[1] . . . User[n]) and select which audio and video stream the other users can view. Optionally, a user interface may be provided that enables a user to specify that none, some, or all of the audio and video streams are to be recorded.

In the group format, any organizational process can be used to create the groups. For example, the following techniques may be used to group users based on similar voice characteristics (such as age, gender, style, individual morphology) and/or by stage of vocal development (beginner, studied, advanced, master, natural, etc.). A user interface may provide a list of students that can be selected and corresponding instruments will be associated with the group. The grouping of users may be automatically performed based at least in part on students' past performance.

The system optionally enables the broadcast of streaming audio and video content of a live feed of two users (the first user and second user), also referred to as the "Players", or a group of users (User[1], User[2] . . . User[n]), also referred to as "Group Players". For example, User[1] plays a local instrument, and User[2] . . . User sing along with their respective remote instruments. The audio/video recordings of the playing of the local instrument and/or of the singing by the users may be live streamed (in real or near real-time) for listening and viewing to respective devices of a large group of users, hereafter referred to as the "Viewers".

Optionally, the system provides the Players or the Group Players the ability to utilize playing of their instruments to cause playing of a remote instrument. The audio and video of playing and/or singing may be captured as separate streams or one combined stream.

The Players or Group Players may optionally select, via a user interface, some or all of the streams to be broadcast. The Players and Group Player may optionally manually select which user player stream is broadcasted to and displayed by user devices. Optionally, an automated process may be used to select which user player stream is broadcasted to and displayed by user devices, wherein the system shifts between the transmission (and display) of audio and/or video of the users during instrument playing based on detected activity, action, sound, speaking, singing, and/or another selector.

When the Players or Group Players are broadcasting a video and/or audio stream, the stream is listed in a user interface on user devices as an available stream which may be joined (e.g., by Viewers so that they may listen and watch the users playing and singing with the local and/or remote instruments).

Optionally the system enables, via a user interface, the Players and Group Players to invite, grant, allow, or permit certain viewers to watch the stream. The stream may optionally be made available publically for any Viewer or selected viewers to join, and may be made available in search results of a Viewer conducting a search for which the stream is a match. For example, in the scenario with either the Players or Group Players, the Viewers may optionally select, via a user interface, one of the available streams including: an individual stream, a combined stream, or a specific user within the stream or combined stream. The combined stream may include audio and/or video streams of some or all of the users.

Optionally, a user interface may enable Players or Group Players to select which user is the broadcasting user, and whether the video and/or audio of the broadcasting user are included in the final stream to be provided to devices of Viewers for viewing/listening. Optionally the system provides the Viewers with a user interface to chat, ask questions and receive answers, comment, like, submit emotion based icons with respect to the current stream they are viewing.

Stream broadcasting may use network streaming protocols such as, by way of example, unicast, multicast, simulcast, or a hybrid approach to optimize the streaming, encoding, and transmitting of the audio and video stream over various network protocols. The selected network protocol may be selected to provide an optimal viewing experience for the Viewers using custom services or publically available services, such as Vidyo, Google Hangouts, or similar offerings.

There may be some instances where users are not able to connect in real-time to access or provide a video and/or audio stream; however, the local instrument playing can be detected and stored for transmission and playing by a remote instrument at a later time. Furthermore, there may be instances where the users have connectivity issues or bandwidth limitations with insufficient latency and jitter which make real-time communications very limited, and in this case, optionally the system may be operated in a non-real-time mode as a solution.

In the case where the first user and second user are not available at the same time, have network connectivity limitations, or decide to operate the system in non-real-time mode, the first user can play the local instrument, and the exercise pattern and absolute key change patterns may be captured using the exercise detection process monitoring for the absolute key change chord. However, instead of being transmitted immediately to a remote instrument for playback, the exercise pattern and absolute key change pattern are stored as a musical pattern in a database grouped by session. A session is a specific group of musical patterns which may be optionally include indications of a beginning and ending of the musical patterns for that grouping, and the session may be stored.

One optional advantage to using the system with the local instrument and exercise detection process without transmission in real-time for playing by a remote instrument, is that such non-real-time process provides the first user with the ability to create, within a short period of time, a series of individual and personalized exercises for the second user so that the second user can play them at a convenient time. Instrument commands (sometimes referred to herein as sequencer commands), are recorded in response to the first user playing on the local instrument, and may be stored with the musical pattern. Subsequent instrument commands (e.g., transpose, set range, stop, and others) can be played and the system provides the first user an interface to view, playback, review, and reorder the stored musical patterns.

In the non-real-time mode, a musical pattern is comprised of the exercise pattern and absolute key change pattern captured during an exercise detection process and any subsequent instrument commands until a Stop command is received to delineate the ending of a musical pattern. The first user optionally can initiate a recording of video and/or audio of a performance, instructions, and/or feedback to transmit to the second user with a given musical pattern. The first user may optionally select a stored video from a library to be transmitted to the second user to accompany the musical pattern.

At a later time, the second user can access the stored group of recorded musical patterns of the first user via the remote receiver (e.g., the remote computing device) and select one or more vocal exercises, absolute key change patterns, and instrument commands to play on the second user's instrument. A user interface is provided on the second user's computing device via which the second user can view the group of patterns, select an exercise pattern, review optionally provided audio and video instructions, and play the recorded local instrument exercise pattern as recorded with the original absolute key, range setting, auto-up/auto-down, ascending interval, descending interval, interval repetitions, and/or other optional settings for each musical pattern.

Optionally, during the playing of stored musical patterns, audio and video of the second user's performance may be recorded and/or transmitted back to the first user computing device for review, comment, and suggestions. Optionally, a user interface is provided which enables the second user to rate, score, and provide feedback of the musical pattern in one or more formats (e.g., 1 to 5 stars, A-F, thumbs up or down, emojis, and/or textual comments) and/or record an audio and/or video message regarding the musical pattern to transmit back to the first user's computing device. The first user can then complete the vocal exercise projection loop in non-real-time by recording an audio/video example of the exercise instruction and recording the next musical pattern, or multiple musical patterns in succession, via the local instrument (e.g., using the local receiver and exercise detection process) to continue the loop in non-real-time.

Optionally, in the case where the musical patterns are stored for playing on a remote instrument at a later time, the first user may be the same person as second user. The user may first play a first instrument, store the played musical patterns and instructions (e.g., comprised of musical exercises, absolute key change patterns, instruments commands, and/or the like), and later use a second instrument (e.g., digital piano, mobile device, instrument simulator, other instrument described herein, etc.) to playback the stored musical patterns as similarly described herein with respect to the second instrument.

Figure 3:
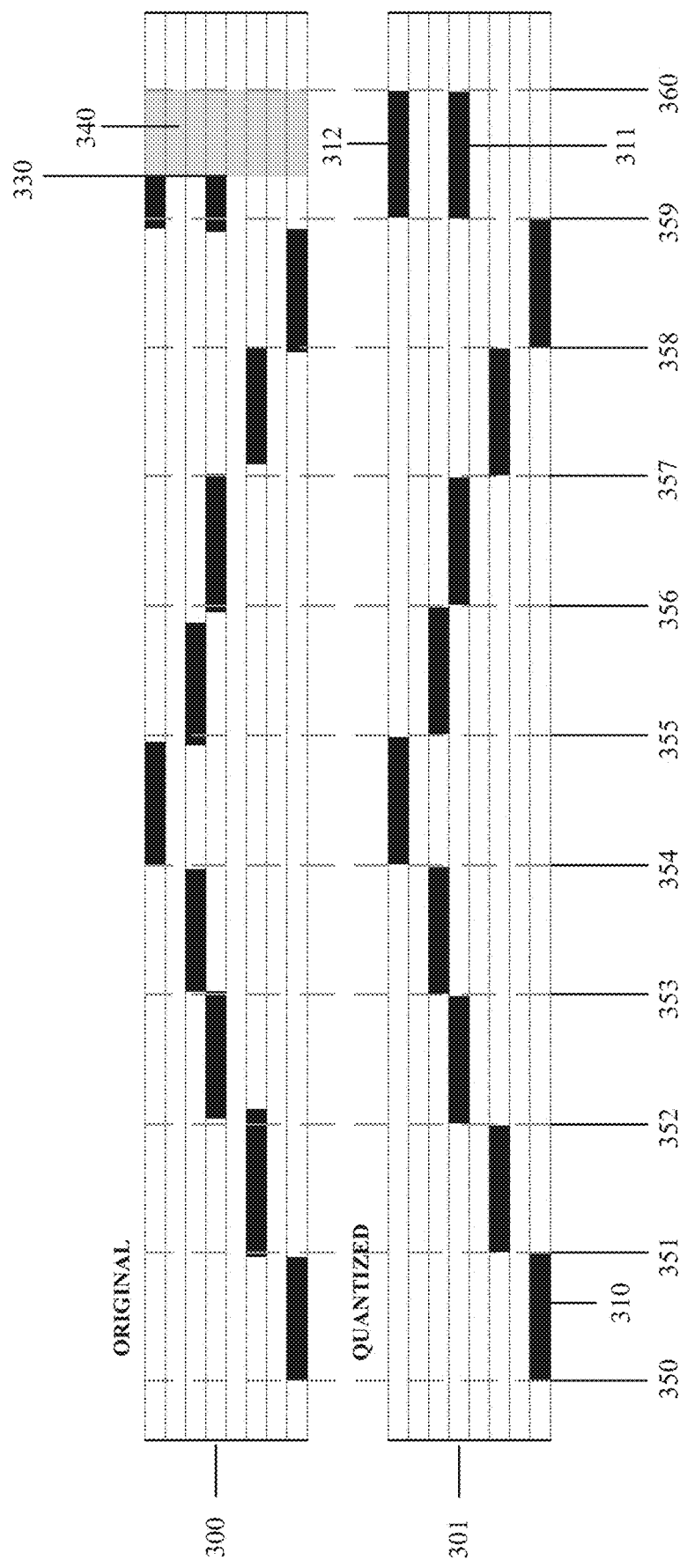
FIG. 3 illustrates an example exercise and a quantization thereof.

An example optional method for correcting the human errors and inconsistencies in playing utilizes a quantization technique, such as that described in greater detail herein with respect to FIG. 3. While quantizing the notes may be helpful for many, it is not always desirable because the playing could be perceived to be too "mechanical" or "robotic". Optionally, to provide such performance subtleties in the note sequences, a process applies a conditioning method to the note sequence to add back slight, minimal, and/or barely noticeable variations to note start and ending time, durations, velocity intensity, and tempo.

The actual modifications and variations to the timestamps of the note sequence, velocity, intensity, and tempo may be performed by the local receiver, local computing device, remote receiver, remote computer device, or by a cloud-based system. The overall perception of second user is that a human is actually playing the remote instrument when in reality the autonomous playback of the vocal exercises and absolute key change patterns on the remote instrument is controlled by the application of the intelligent playing to the entire patterns or selected portions thereof.

Optionally, the input for the exercise pattern and absolute key change chord may be uploaded as a MIDI file to the system. Optionally, the system may provide a MIDI sequence track editor or generic music note sequence editor in a piano roll format or event order listing by timestamp. Whether a MIDI file is uploaded or the sequence is created or modified by a sequence editor, the note sequence may be missing the human performance qualities and benefit from the conditioning method application during playback. The usage of the conditioning method is optionally applicable to all embodiments disclosed herein.

The communication channel for connecting the instruments over a network may take a variety of forms using protocols such as HTTP/HTTPS, TCP/UDP Sockets, Web sockets, Web Real-Time-Communication (WebRTC), or other protocol. As discussed above, the type of data transmitted over the communication channel may include note sequences containing exercise patterns, absolute key change patterns and sequencer commands, as well as the optional audio and video streams between the devices of users. The communication protocols, networks, and paths which transmit the note sequences do not necessarily need to be the same as the protocols, networks and paths that transmit the optional audio and video streams.

Optionally, the audio and video streams may be full duplex to enable simultaneous users to sing or speak at the same time. Thus, for example, in full duplex mode both the first user can be speaking and second user can be signing and second user can hear the first user speak while the first user hears second user sing. In the scenario where the second user utilizes headphones, since the remote audio may not be played via speakers to be captured by the remote microphone and transmitted over audio stream back to local the first user, the system may optionally implement a simultaneous playing of the remote instrument via a second audio stream. This enables the first user to hear second user singing along with the playing of the remote instrument, and at the same time an additional audio stream with the remote instrument is played so the first user hears the same audio as second user does.

The system may optionally provide the first user and second user access to a software audio mixing tool. The mixing tool may be used to adjust the sound levels in the mix. For example, the mixing tool may enable a user to control the level of audio of the local and remote instruments and/or the audio levels, and/or to adjust the sounds levels of the instruments or users. The instruments may be connected in a hub-spoke arrangement, where each instrument, instrument receiver, or computing device connects to a central server acting as the hub and where each instrument acts as a spoke. When a spoke wants to communicate to another spoke it first sends the message to the hub, which utilizes a spoke device identifier for the destination spoke to relay the communication to the destination spoke. The spoke identifier may be a specific instrument identifier, a virtual room identifier (e.g., a virtual room that users enter along with their instrument), a specific user identifier (e.g., player or viewer), a specific user location identifier (e.g., local or remote), a session identifier, or a group identifier. The spoke may provide some or all identifiers to the system to participate in the sending and receiving of instrument data.

Optionally, the instrument commands may include or exclude certain spokes based on the specific implementation of the instrument command action. For example, if the system has a first user spoke and a second user spoke attached to the hub and identified by instrument identifiers and a session identifier, when the first user sends a pause command to the hub, the hub may understand that the command only needs to be transmitted to the other user, the second user in this case. Furthermore, optionally, the hub may relay all instrument data to all spokes and leave the implementation up to a given receiving spoke to understand if the message is intended to be executed by the receiving spoke.

A Hub-spoke topology may optionally be used to solve connection problems created by firewalls. In other embodiments, where performance is desirable, the instruments, instrument receivers, and/or computing devices may connect in a peer to peer topology before or after first learning about the location on the network of the other endpoint. Technologies, such as Session Traversal Utilities for NAT (STUN), Traversal Using Relay around NAT (TURN), and Interactive Connectivity Establishment (ICE), may be used to solve technical challenges posed by firewalls, and to improve the reliability of IP communications over a network such as the Internet, when establishing or maintaining connections.

To facilitate practice, study, and auditions, users of the system may create online accounts to enable a user access recordings of exercise patterns and audio and video streams. The access may be granted without a time limit or for a set duration of time. Single access tokens may be created and provided for various uses to permit unauthenticated visitors to review, comment, or rate selected exercises and recordings. Optionally, the exercise patterns, pattern sequence progression records, and audio and video recordings may be stored in a database, file, or binary formats and shared with others users such as friends, family, parents, singers, musicians, etc. The shared users may optionally be able to provide feedback, comments, or review. Optionally, users may be enabled to upload audio and/or video content discussed herein to social sharing websites, such as SOUNDCLOUD, VIMEO, YOUTUBE or the like.

The system will now be described with reference to the figures representing optional embodiments. FIG. 1 depicts an example of the vocal exercise projection loop which may be used to enable a user, such as an instructor, to train another user, such as a student, with respect to musical exercises.

While certain examples herein may refer to a keyboard instrument, other instruments may be used as well. For example, an instrument may be a keyboard instrument, a synthesizer, a string instrument, a wind instrument, a percussive instrument, or other instrument-type. Further, while certain examples herein may refer to receiving commands via a keyboard note key (e.g., when an instrument has a keyboard), the commands may also be received via other input mechanisms, such as, by way of non-limiting example, instrument strings (e.g., when an instrument has strings), via a resonator blown into by a user or air pump (such as an instrument that has a wind component, such as a trumpet, clarinet, oboe, flute, etc.), or via a percussive element (e.g., which an instrument has a percussive component).

Referring to FIG. 1, a musical instrument 100 (e.g., a digital piano, keyboard, guitar, violin, other string instrument, wind instrument, percussive instrument, synthesizer, or other instrument), sometimes referred to as herein as a local instrument, is coupled to a computing device 102 (e.g., a desktop computer, a laptop computer, a tablet, a smart phone, an embedded computing device). The musical instrument 100 may be local to user 132, who may be an instructor. The musical instrument 100 transmits a signal comprising event data representing the playing of a musical (e.g., vocal) exercise (e.g., captured in the form of notes and/or chords with durations, velocities, intensity, and timings) to the computing device 102 (sometimes referred to herein as a local receiver), which may be local to the instructor or other source of training content. It is understood that the musical instrument 100 and the computing device 102 may be optionally integrated into a single device within the same housing.

The musical instrument 100 may be coupled to a computing device via wired or wireless interface such as by way of example USB, Apple Lightening, Bluetooth, or BLE. The computing device 102 may capture the vocal exercises via the interface (as reflected in the playing of the instrument), and transmit the exercises over a network (e.g., the Internet, a local area network, a wide area network, a personal area network, etc.) to a remote musical instrument for reproduction. Such reproduction may optionally be utilized in the context of voice and singing practice and training.

When the musical instrument 100 is a MIDI-equipped instrument, the MIDI-equipped instrument may optionally transmit information (e.g., MIDI commands) from the MIDI-equipped instrument to the computing device 102 via a USB interface or a 5-pin connector. By way of example, the computing device 102 may run any operating system, such as Microsoft Windows, MAC OS X, Linux, iOS, Android, Chrome, etc. The computing device 102 may include a web browser API (application programming interface) or plugin that supports external peripheral connections (e.g., to USB, Lightening, BLE, or MIDI ports).

The computing device 102 may monitor the signals of the musical instrument 100 (e.g., in the form of digital music data packets) in real-time and executes an exercise detection process, an example of which is illustrated in FIG. 5, discussed in greater detail herein. The digital packets format may represent a musical note sequence played using the musical instrument 100. By way of non-limiting examples, the digital musical packets may be transmitted in a MIDI stream and may be formatted as MIDI packets, variations thereof, or using a custom protocol or custom format representing the musical note sequence.

The vocal exercises and/or musical accompaniment (collectively referred to as musical content) may be optionally in the form of electronic musical instrument commands (e.g., MIDI or MusicXML (a standard open format for exchanging digital sheet music)) or sound track files (e.g., mp3 or wav) stored in a digital library (e.g., using a cloud based storage system) for future use, and accessed as needed. The vocal exercises and/or musical accompaniment may be associated with and stored with metadata that can be used for searching, filtering, or sorting. For example, if a user is searching for a given type of item of musical content, the user can enter search terms into a search field, and a search engine may search for musical content that has matching metadata.

A user interface may optionally be provided by the computing device 102 via which a user can select from a library of musical content. The selected musical content may be utilized as a musical accompaniment, or used to command and play an electronic instrument, thereby simulating live playing of the musical instrument. For example, the selected musical content may be transmitted from the computing device 102 (or cloud system hosting the library) over a network to a remote instrument to play the musical accompaniment.

The computing device 102 may include a display, a sound transducer 101 (e.g., a microphone configured to capture audible sounds, such as voice and instrument sounds), and a video camera 106. The computing device 102 may host or access a conferencing application that enables the user 132 to conduct audio-only communications and/or video conferences (which include audio) with one or more remote users, such as remote user 122, who may be a student. The computing device 102 may also be coupled to an audio playback device 130, such as a speaker, headphones, earbuds, or other sound reproduction devices.

For example, the user 132 may optionally provide the remote user 122 with singing instructions for a singing exercise. For example, the instructions may be provided verbally and/or via video over a communication channel 110 (e.g., the Internet, an intranet, a wide area network, a local area network, and/or the like) using the transducer 101 and camera 106 to provide the exercise pattern, vowels, and consonants.

As noted above, the exercise detection process (see, e.g., FIG. 5), is optionally run simultaneously. Musical signals from the instrument 100 may be monitored by the computer 102 to capture and detect an exercise pattern 103 and an absolute key change pattern 104. The absolute key change pattern 104 may be in the form of one or more patterns, tempo variations, chord combinations and/or triad combinations. The captured absolute key change pattern 104 may be used to detect a key change that indicates the end of the exercise in a current key and signal a modulation to the next key or that the current key should be maintained. As will be discussed with reference to FIG. 3, the exercise pattern and/or absolute key change pattern may be quantized, to correct timing or playing mistakes. Optionally, the computer 102 may modify tempo, velocity, intensity, and/or durations of the exercise pattern 103 and/or absolute key change pattern 104.

The exercise pattern 103 and corresponding data for the note sequence, tempo, durations, and timing maybe be transmitted as a bundled command which, optionally, contains all the associated data in a single message transmitted over the channel 110 to the computer 124. Optionally, note sequence, tempo, and/or key may be transmitted individually, in the form of instrument commands, and reassembled by the computer 124 for reproduction. Furthermore, in respect to the note sequence data that represents the exercise pattern 103 and absolute key change pattern 104, the patterns may be transmitted as a MIDI file, a generic music format, or a note sequence format that is not MIDI, where the file or format provides the corresponding timestamp, pitch, duration, intensity, and/or velocity.

The computing device 124 (which is sometimes is sometimes referred to as a remote receiver) may include a display, a sound transducer (e.g., a microphone) 123, and a video camera 125. The computing device 124 may host or access a conferencing application that enables the user 122 to conduct audio-only and/or video conferences (which includes audio) with the user 132. The computing device 124 may also be coupled to an audio playback device 120, such as a speaker, headphones, earbuds, or other sound reproduction devices.

When the computing device 124 receives the instrument commands from computing device 102 (or from a cloud system hosting instrument commands), the computing device 124 executes the commands on the instrument 140 to reproduce the exercise pattern and absolute key change pattern from instrument 100 of user 132 on instrument 140 of user 122. The instrument 140 of user 122 may be a digital piano, keyboard, guitar, violin, other string instrument, wind instrument, percussive instrument, synthesizer, or other instrument. Optionally, the instrument 140 may not be a physical instrument and the computing device 124 may implement, digitally, the musical instrument (e.g., as a virtual synthesizer), play the instrument commands and output audible sound via the audio playback device 120.

For example, the computing device 124 may play the received exercise and absolute key change pattern using sound files, sample-based synthesizers, or audio samples (e.g., WAV or MP3 formatted samples). Optionally, in some embodiments, the audio playback devices of either user 132 or user 122 may be in the form of headphones. When user 122 hears the vocal exercise via the audio playback device 120, user 122 sings along with the exercise simultaneously to exercise and train the user's voice. The audio and/or video stream of user 122 singing along with the exercise is captured, and optionally recorded in memory for later access, via the transducing device 123 and video camera 125. The captured singing and video may be digitized and transmitted by the computing device 124 via a communication channel 150 to communication channel 110, and then to computing device 102 for reproduction to user 132.

The sound of the instrument 140 may also be captured (e.g., via the transducing device 123) in the audio stream to create an audio track of user 122 singing with the instrument 140 playing the vocal exercise received from computing device 102. In certain scenarios, the user 122 may be using headphones or other private listening device and, in this case, optionally only the voice of the user 122 will be captured via the transducing device 123, which in turn will be streamed to the computing device 102 and optionally recorded by computing device 102 and/or by a remote cloud system. Optionally, the voice of the user 122 and a virtual audio loop that can simultaneously be played via the audio playback device 120 and recorded by the microphone 123. The corresponding microphone signal may be transmitted over the network to the computing device 102 for reproduction to user 132.

Optionally, echo-cancellation may be enabled or disabled on one or both sides of the communication channel 110 by a user. Where the audio playback device 130 is a headphone or other private listening device (and hence the transducer 123 may not capture the sound of the instrument 140), the audio playback of the original musical instrument may be omitted from the audio data transmitted to the computing device 102, and the user 132 will only hear the voice of user 122 singing reproduced. The computing device 124 transmits the audio and video stream over the network 110 to the computing device 102 associated with the user 132.

Optionally, where user 122 is utilizing headphones while the user 122 is singing, the voice of user 122 (as captured by the microphone 132) may optionally be combined with a virtual audio loop (that enables the digital transfer of audio data between computer programs), direct jack, or virtual driver transducing of the remote instrument 140 by the remote computing device 124. The combined voice/instrument signal may be transmitted to and reproduced by the headphones of user 122. In addition, the combined voice/instrument signal may be transmitted to the computing device 102 for playback to the local user 132, so that the local user 132 hears the voice of user 122 along with the remote instrument 140, even though the remote instrument 140 was not recorded using the microphone 123 (as it was only played audibly by the headphones and not the speakers). Optionally, in response to a user command provided via a user interface, the combined voice/instrument signal may be simultaneously transmitted to and reproduced by the speakers 120 and headphones of user 122, while the user 122 is listening via headphones.

The computing device 102 associated with the user 132 receives the audio stream and plays the audio stream via the playback device 130 associated with the user 132. The user 132 is able to hear the user 122 singing along with the vocal exercise 103 and absolute key change pattern 104. The user 132 may continue to continue the vocal exercise projection loop by providing additional instrument commands (e.g., by playing or otherwise providing commands via the instrument 100 or computing device 102). By way of example and not limitation, the user 132 can command changes that transpose the absolute key, add or remove repetitions, increase or decrease tempo, pause, resume, repeat, stop the current and/or last played exercise. Optionally, during the vocal exercise projection loop, a two-way audio and video communication channel may be established over the network 110 between the computing device 102 and the computing device 124.

The communication channel enables the user 132 to communicate via video and/or audio with the user 122 and visa-versa from the user 122 to the user 132. Optionally a given user may mute or unmute audio and more turn the video communication on and off. By way of example, the user 132 may utilize the communication channel to provide continuous and real-time comments, feedback, suggestions, and guidance to the user 122 before, during, and after the vocal exercise.

Figure 1A:
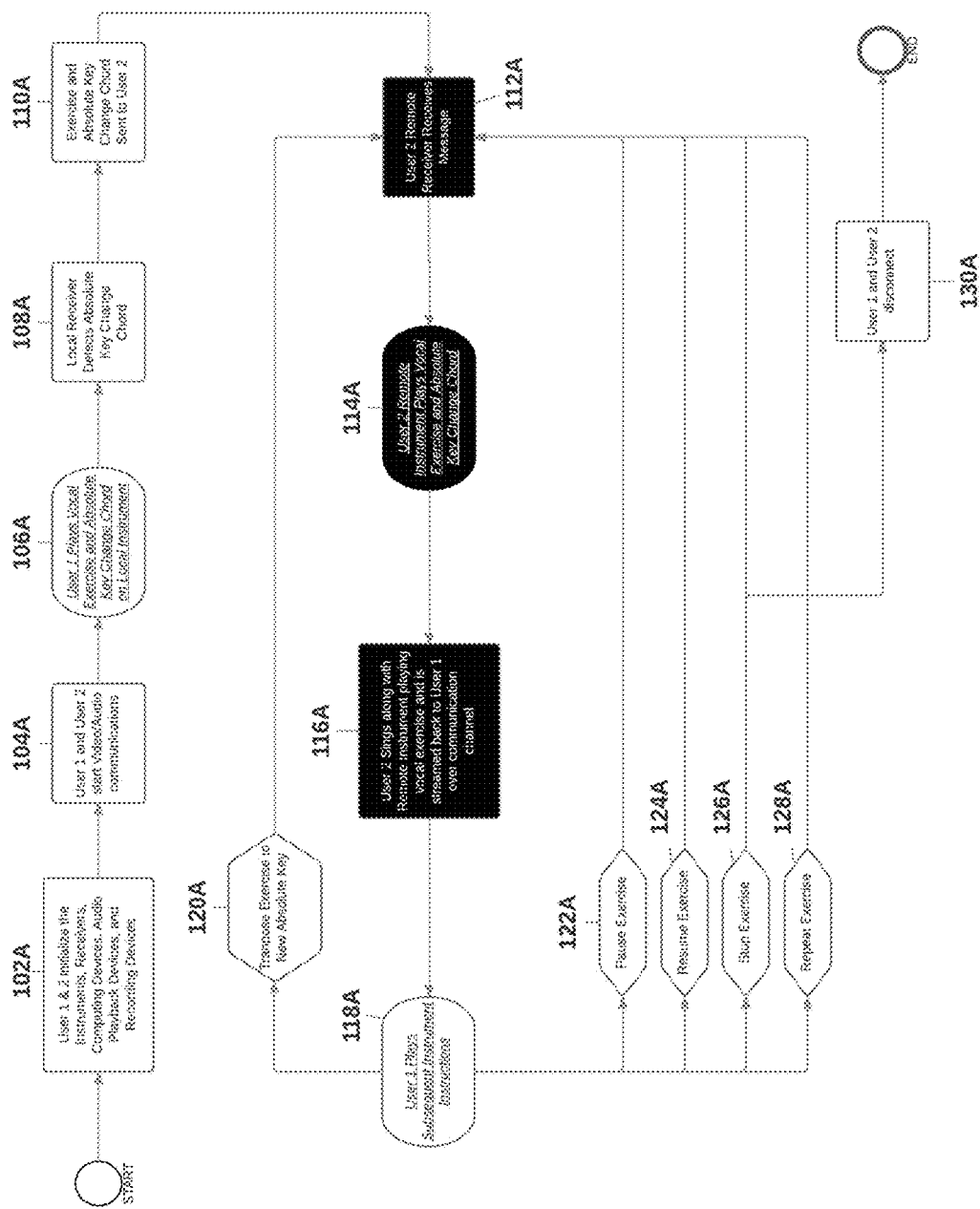
FIG. 1A illustrates an example process.

FIG. 1A illustrates an example vocal exercise projection loop process. The illustrated process enables the user 132 to hear the user 122 singing and the instrument 140 playing via data transmitted over the network from the computing device 124 to the computing device 102. Further, the process enables the user 132 to issue continual instrument instructions via the instrument 100 over the network 110 to the instrument 140 to make real-time changes to the musical exercise. Further, the process enables the user 132 to utilize the two-way video and audio communications to see and hear the user 122 and to guide the user 122 using real-time feedback, as well as provide real-time instrument instructions to direct the vocal exercise for the singing of the user 122.

At block 102A, various components (e.g., instruments 100, 140, computing devices 102, 124, audio playback device 130, 124, transducer devices 101, 123, and/or the video cameras 106, 125) are optionally initialized (e.g., in response to an initialization command from the users 132, 122). For example, the initialization process may include some or all of the following: provide power to and turn on devices, log-on to a music instruction system (e.g., with user identifier and password via computing device 102 and/or 104), initiate an instruction session, establish a communication channel between the instruments 100, 140 over the network, and clicking on a start button.

Optionally, at block 104A, user 132 (e.g., an instructor) and user 122 (e.g., a student) initiate a video/audio communication channel over the network 110. At block 106A, as user 132 plays a vocal (or other) exercise and absolute key change chord on the instrument 100, an exercise detection process is executed. A block 108A, the computing device 102 detects the absolute key change chord. At block 110A, the detected exercise pattern and exercise key change chord is transmitted over the network 110 to the computing device 124 where user 122 is located. In the next state, the computing device 124 receives via the network processes the message.

At block 112A, the instrument 140 plays the vocal exercise and absolute key change chord. Optionally, a remote introduction may optionally be played before the first playing of the exercise by the instrument 140. For example, the remote introduction may be provided by the computing device 102 over the network 110 to the computing device 124, and then to the musical instrument 140, which will then play the introduction. By way of illustration, the introduction may include a metronome sound (e.g., tick-tock sound), a count in (e.g., ready-set-go or ready-1-2-3), and/or lead-in playing (e.g., play the last one or two beats, measure, or portion of the pattern) on the remote side to aid user 122 in understanding the key and tempo before user 122 begins to sing along so that when user 122 commences singing along with the accompaniment, user 122 will do so in rhythm. The option to enable or display a remote introduction playing, select the style of remote introduction playing, and set the number of beats to play during introduction may optionally be selected via a user interface by user 132.

At block 114A, repetitions of the exercise pattern and absolute key change pattern are played by the instrument 140 in manual mode or automated mode. During the manual mode the system plays the exercise pattern and absolute key change pattern for a set number of iterations or endlessly, and waits for subsequent instrument commands from the instrument 100 and/or computing device 102, such, by way of example, transpose key, pause, repeat, or stop.

In the automated mode, the system operates in either an auto-up or auto-down mode, where the mode may be selected by user 132 via a user interface provided by the instrument 100 or computing device 102. Optionally, a range command, including highest and lowest note boundaries, can be entered via a user interface by user 132 via the user interface. The highest and lowest note boundaries may be used with the auto-up mode to change the key in an ascending mode until the highest note boundary is reached, at which point instrument 140 may stop playing or may switch direction to a descending mode until the lowest note boundary is reached. Similarly, the highest and lowest note boundaries may be used with the auto-down mode to change the key in a descending mode until lowest highest note boundary is reached, at which point instrument 140 may stop playing or may switch direction to an ascending mode until the highest note boundary is reached. Optionally, other settings and features may be utilized. At block 116A, while the instrument 140 is playing, user 122 sings along with the exercise. The singing, and optionally the sound from the instrument 140, are captured by the transducer device 123 and streamed via the computing device 124 over the network 110 to the computing device 102 for reproduction by the computing device 102 or instrument 100.

At block 118A, the computing device 102 monitors the instrument 100 for any subsequent instrument commands from user 132. FIG. 1A several example instrument commands, are illustrated such as transpose key 120, pause exercise 122A, resume exercise 124A, stop exercise 126, and repeat exercise 128A. Other commands may be provided as well. During the automated mode the repeat command may be used while the instrument 140 is playing to cause the current repetition of the exercise pattern to be repeated, with the absolute key change pattern remaining in the same key. When the instruments 100 and 140 have been stopped from playing, activation of the repeat key command causes instrument 140 to replay the exact exercise pattern and absolute key change pattern in the original starting absolute key. Additional commands that may be issued include set range, change tempo, toggle between auto-up/auto-down, repeat in new start key, as well as other commands.

The set range command may be set via an interface by the user 132, for example, before playing the musical pattern. By way of further example, the set range command may also be set by the user 132 by pressing two keys of the instrument 100 (optionally at the same time), where the corresponding to the highest note sets the top note boundary and the key corresponding to the lowest note sets the bottom note boundary. The advantage of using two keys (or notes, triggers, or other events on the musical instrument 100) at the same time is it is unambiguous the system can know both of the absolute keys without having to guess the meaning of each key if only one key were pressed at a time which order does each key mean, or if a mistake is made to replay the first key, may be complicated. Pressing two keys removes any guess work by the system and keeps things simple. Optionally, the range command can be entered via a user interface by a user during real-time playing or via a user interface by a user prior to the training session with user 122.

The change tempo command enables user 132 to speed up or slow down the exercise. Optionally, a specific instrument key may be assigned as a tempo control, where the user 132 may command a new tempo by tapping the assigned key. For example, the user 132 may command a tempo change while the keyboard 140 is playing or when the playing is stopped or paused. Optionally, a change tempo user interface may be provided via the display of computing device 102, which enables the user 132 to command a tempo change. Upon setting the tempo in the user interface, the corresponding command is transmitted via computing device 102 to computing device 124, which may then cause the tempo of the music to be played accordingly by instrument 140.

The toggle auto-up/auto-down automated direction instrument control provides user 132 a control to switch the auto mode via the instrument 100. Optionally, in addition or instead, the toggle control may be provided via a user interface on computing device 102.

The "repeat in new start key map" command may optionally be executed to change the first key of the exercise, when played on the instrument 140, to a different key than the previous key used for the exercise when a repeat command is issued by the user 132. The vocal exercise projection loop illustrated in FIG. 1A may continue until one or both users 122, 132 end the session (e.g., via a terminate, log out, or close command), at which point the communication channel between the devices of user 132 and of user 122 may be terminated.

Figure 2:
FIG. 2 illustrates example exercises.

FIG. 2 illustrates non-limiting examples of vocal exercise patterns 210 (including exercise patterns 211, 212) and absolute key change patterns 220 (including absolute key change patterns 221, 222, 223, 224, 225, 226). An example vocal exercise pattern as represented in the column of 210 is the 5 tone scale in the key of C Major whether written in Solfeggio, Do-Re-Mi-Fa-Sol-Fa-Mi-Re-Do; in numerical form, 1-2-3-4-5-4-3-2-1; or in key names, C D E F G F E D C, and followed by an absolute key change pattern the column of 220. In key change pattern 221, the key does not change, but in other variations, like key change pattern 223, the key changes from C Major to Db Major, which is a transposition up a semitone. A semitone is the smallest interval conventionally used in classical Western music, equal to a twelfth of an octave or half a tone, also known as a half step. Optionally, the system may be utilized with non-Western music systems and tonal scales. The next repetition of the exercise would be played in the new absolute key. Likewise, in key change pattern 224, the key changes from C Major to B Major, which is a transposition down by a semitone. Other key change patters may be used to demark the end of the vocal exercise and future repetitions of the exercise in the same key or transpositions to new absolute keys. Optionally, the key may be changed further than a semitone to include a whole tone. Even larger key changes may be used to jump to any new absolute key.

As can be seen from key change patters 221, 222, some patterns may omit the tonic and only play the top 3rd and 5th of the triad. Other example key change pattern chords may include various combinations of notes within the minor chord (or other chords) such that only part of the chord is played or the entire chord is played. Examples of chords may include but are not limited to variations like [3:5], [1:3:5], [1:3:5:8], [1:3:5:8:10], [1:3:5:8:10:12], [1:3:5:8:10:12:15] or the dominant Fifth chord of the new key written in Roman numeral notation as $[V^b:vii^b:ii^b]$ which would lead into the new key $[I^b:iii^b:V^b]$. In vocal exercise pattern 211, the last note in the exercise pattern is a quarter note; and the other the notes are eighth notes. The subsequent absolute key change pattern 225 may also be a quarter note, to keep the rhythm of the pulse of the exercise pattern in tempo with the absolute key change pattern without changing the pulse or turning the beat around. In vocal exercise pattern 212, the last note in the exercise pattern is a half note; and the other notes are eighth notes. The subsequent absolute key change pattern 226 may also be a half note to keep the rhythm of the pulse of the exercise pattern in tempo with the absolute key change pattern without changing the pulse or turning the beat around.

The exercise patterns and absolute key change patterns may be any exercise or key change pattern. The note durations contained in the vocal exercise pattern and the absolute key change pattern may be of different durations or of the same durations.

FIG. 3 illustrates quantization of notes played by the user 132 (e.g., an instructor) on the instrument 100 prior to transmission for playback on instrument 140. For example, the exercise pattern and/or absolute key change pattern may be quantized (e.g., to restrict the note lengths to discrete values), to correct irregular playing, errors, or timing nuances. In the example, a detected vocal exercise pattern is presented in pitch notation where each horizontal line represents a semitone. FIG. 3 also illustrates how the original exercise pattern may, optionally, be processed into a quantized exercise pattern.

In the original vocal exercise pattern 300, a Major scale pattern rendered in Solfeggio, (in numerical form or in key names) the absolute key change pattern 330 is repeating the same absolute key. The vertical dotted lines 350, 351, 352, 353, 354, 355, 356, 357, 358, 359, 360 represent the pulse of the exercise and may be calculated using different algorithms. One example calculation uses, for an exercise, the average start time distance between each note in the original playing to calculate the averaged pulse and spacing the notes equidistantly over the duration of original length of the exercise.

Additionally, the vocal exercise pattern 301 shows one optional embodiment in which the original note durations are averaged into a quantized format where all of the note durations are the average length 310. Various algorithms for quantizing may be applied to some or all of the exercises so that the best possible remote performance is achieved. The quantized result 301 shows how the vertical lines with the averaged notes line up and create the same total duration of the exercise but in a clean and precise performance. During the original absolute key change pattern 330, the notes are not full length notes. Not requiring the passage of time for the full length of the absolute key change pattern to pass provides an optional advantage for the exercise detection process. The detection may complete prior to completion of playing the exercise. This provides extra time for processing, quantization, and transmission of the instrument command, in real-time, from the computing device 102 to the computing device 124.

The processing and transmission time 340 may occur before the end of the original absolute key change pattern's last note completes playing. In this way, there is no human perceptible audio delay with respect to the playing of instrument 100 by user 132. Furthermore, receipt of the instrument command, as well as he processing and playing by the instrument 140, may be synchronized so that the pulse and tempo played by the user 132 on instrument 100 and that reproduced by instrument 140 does not halt, slow, or change. The perception of a seamless continuation of the exercise playing switches between user 132's speakers 130 and microphone 101 which is heard by user 122 (e.g., a student) and then switches to user 122's speakers 120 and microphone 123 which is heard by user 132.

In the example where the original absolute key change pattern 330 is detected in the middle of the note playing, and the original exercise pattern is quantized, it may be desirable to complete the full duration of the absolute key change chord 311 and 312.

Figure 3A:
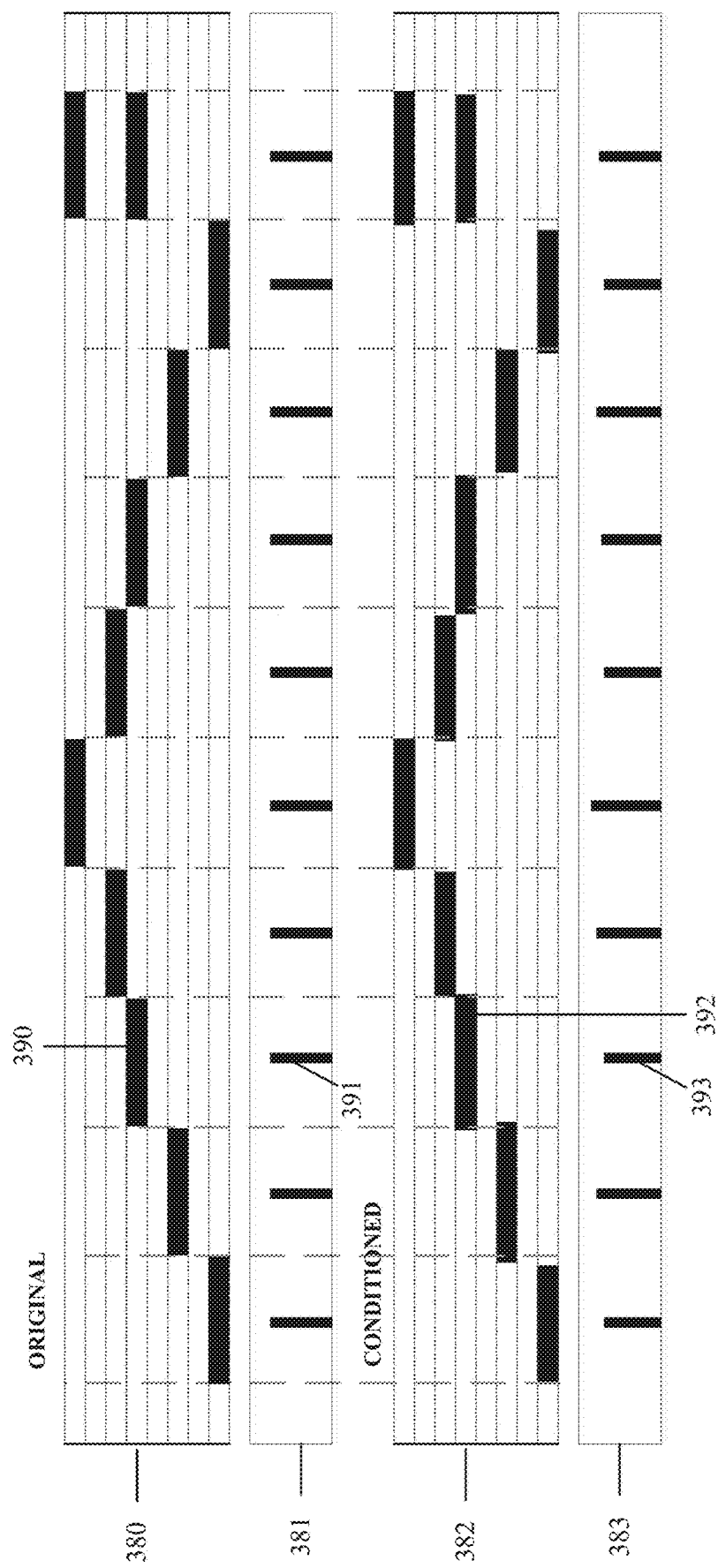
FIG. 3A illustrates an example application of conditioning to an exercise.

FIG. 3A illustrates an example conditioning method which can be performed on a musical pattern to modify the musical pattern so as make the playing of the musical pattern sound more natural by adding subtle human-like performance factors. The horizontal row 380 illustrates an example of a note sequence in a near perfect form having even durations, starting times in line with the ending times of the preceding notes, and all played at the same level of intensity, velocity, or volume. The horizontal row 381 illustrates that the intensity for each note in the sequence is the same.

The vertical bar 391 represents the intensity as a line, expressed as a percentage from 0-100, or other range expression. Some velocities of the notes may not be the same because the notes have been uploaded from a MIDI file or have been created using a note sequence editor (e.g., a MIDI editor) which usually set a default intensity for playing a note. Additionally, applying the conditioning process during playback of the exercises (e.g., exercises recorded during real-time playing, exercises uploaded from a MIDI store or MIDI instruments, exercises recorded for playing at a later time, or other exercises) provides a greater perception that a human is playing the instrument which increases the perceived artificial intelligence, believability, and spontaneity of the system.

In this example, the note 390 is a reference note and 391 is a reference intensity, utilized by the conditioning process. The horizontal row 382 corresponds to the conditioned exercise, where the conditioned notes have irregular starting and ending times, both before and after the preceding ending of the previous notes, notes with different durations, and notes with different velocities. The horizontal row 383 illustrates the intensity for each note, with each note having a different intensity. The note 392 is the conditioned version of original note 390. When the note 390 is conditioned, the start time end, end time, and the duration of the note are accordingly modified. In addition, the intensity 391 is modified to intensity 393.

Optionally, the system may provide user 132, via a user interface, options to select certain degrees, factors, quantities, and/or other settings to be used in making adjustments to the modifications applied by the conditioning process to the notes, start times, end times, durations, and/or velocities of a musical pattern. Optionally, the system may apply a machine learning algorithm to learn, over time, the performance subtleties of a user/player and create individualized conditioning processes to apply to the music played by the student instrument in the absence of a human player. Thus, an individualized performance style may be generated unique to a given user or set of users.

Optionally, the system may allow users to select a specific conditioning process from a menu of different conditioning processes (e.g., provided as a list, via a dropdown menu, or otherwise via a user interface). The system optionally enables users to share individualized/customized conditioning processes.

Optionally, the combination of the quantization process and conditioning process may be applied together simultaneously.

FIG. 4 depicts an example representation of the horizontal passage of time for a musical pattern exercise, both in its original form and as transposed. In the illustration, the original version of the musical pattern (as played on instrument 100) has a starting time on the left, continuing to the most recent time on the right. The representation continues with a quantized version of the musical pattern, which will be played by instrument 140. As illustrated, in this example, the detection and transmission of musical (e.g., vocal) exercises and absolute key change patterns occur without a delay of time. The horizontal row 410 depicts the notes played by the instrument 100. The horizontal row 411 depicts an audio stream of user 132 (e.g., an instructor) speaking or singing. The horizontal row 412 depicts notes played by the instrument 140. The horizontal row 413 depicts an audio stream of user 122 (e.g., a student) singing along with the instrument 140 playing the musical pattern exercise and absolute key change chord.

In particular, in this example, the original vocal exercise pattern 400 and the original absolute key change pattern 420 are first played by user 132 on the instrument 100. The passage of time 421, from when the computing device 102 detects the exercise and absolute key change pattern to the time when they are played by the instrument 140, is depicted. At time 422, the processing of the musical pattern and transmission of the musical pattern from the instrument 100 to the instrument 140 occurs. The quantized version of the exercise pattern 401 is received by the computing device 124, and used to play the instrument 140 at user 122's location.

In this example, the user 132 issues a transpose exercise note command 425 (e.g., by playing or pressing certain keyboard keys on instrument 100, where the keyboard keys may be note keys) which is transmitted 426 to the instrument 140. This causes the next repetition of the playing of the exercise on the instrument 140 to be accordingly transposed. Other example commands that may optionally include, without limitation, one or more of the following commands: transpose, pause, resume, repeat, stop, range, tempo, automated direction, or other command. When the transpose exercise note command 425 is received by the computing device 124 before the playing of the next absolute key change pattern, the transposition to any new absolute key transmitted from the instrument 100 to the instrument 140 is set.

In response to the transpose exercise note command 425, the absolute key change chord 427 is played in the new absolute key by the instrument 140. The quantized pattern 402 is a repetition of pattern 401 played in the new absolute key played by user 132 during the playing of exercise pattern 401 on the instrument 140, where such note is specified in the transpose exercise note command 425. If multiple transpose exercise notes are played during a single repetition of the exercise by the instrument 140, the last received transpose exercise note is used.

Figure 4A:
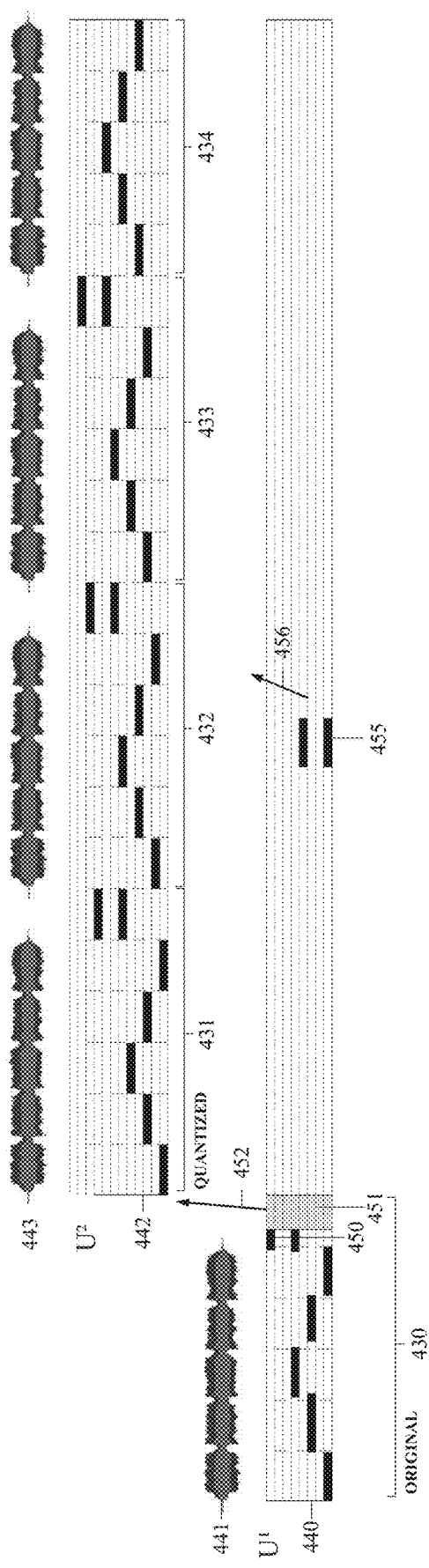
FIG. 4A illustrates an example application of a range command.

FIG. 4A depicts an example representation of the use of a range command, in the auto-up direction, with an automated stop at the top note boundary using a horizontal passage of time format. The original musical pattern exercise, as played on instrument 100, starting time is depicted on the left, continuing to the most recent time on the right for the original pattern. Following, the quantized version of the musical pattern exercise, as played on instrument 140, is depicted. The horizontal row 440 depicts notes played by the instrument 100. The horizontal row 441 depicts an audio stream of user 132 (e.g., an instructor) speaking or singing. The horizontal row 442 depicts the notes played by the instrument 140. The horizontal row 443 depicts an audio stream of user 122 (e.g., a student) singing along with the instrument 140 playing the exercise and absolute key change chord. The original vocal exercise pattern 430 and the original absolute key change pattern 450 are first played by user 132 on the instrument 100. The passage of time 451 corresponds to the passage of time from when the computing device 102 detects the exercise and absolute key change pattern to the time when they are played by the instrument 140. At time 452, the processing of the musical pattern and transmission of the musical pattern from the instrument 100 to the instrument 140 occurs. The quantized version of the exercise pattern 431 is received by the computing device 124 and played via the instrument 140.

In the illustrated example, the system is operating with the auto-up setting. During the second repetition of the exercise pattern 432, the repetition is automatically increased by the specified ascending interval, in this case a semitone, when played by the instrument 140. The subsequent instrument command, a key range command 455, is specified using two keyboard keys (optionally two keyboard note keys pressed at the same time) which respectively set the lowest note boundary and the highest note boundary of the absolute key of the exercise.

Optionally, the range command may optionally be implemented as two or more different commands. For example, a first range command may be a key range command which sets the range for the playing of the absolute keys. A second range command may be a note range command which sets the range for any notes within the exercise pattern. For example, because musical exercises typically contain notes higher or lower than the starting note it may be advantageous to use the note range command to keep exercises from going above or below certain specified notes.

Optionally, a user interface may be provided via which the user can select which range command implementation is to be used. In the illustrated example, the key range command is utilized, which starts in the key of C and spans 4 semitones from C to Eb, a minor third. The instrument command is transmitted 456 via the network from the computing device 102 to the computing device 124. The instrument 140 plays another iteration of the exercise pattern 433, again using the auto-up setting, and incrementing by the ascending interval of a semitone. In the final exercise pattern shown 434, the system reaches the top note boundary set by the range command and stops the playing by instrument 140. Optionally, a user interface is provided via which a user can specify that the playing should switch directions (descending) or stop playing when the specified range boundary is reached.

Figure 4B:
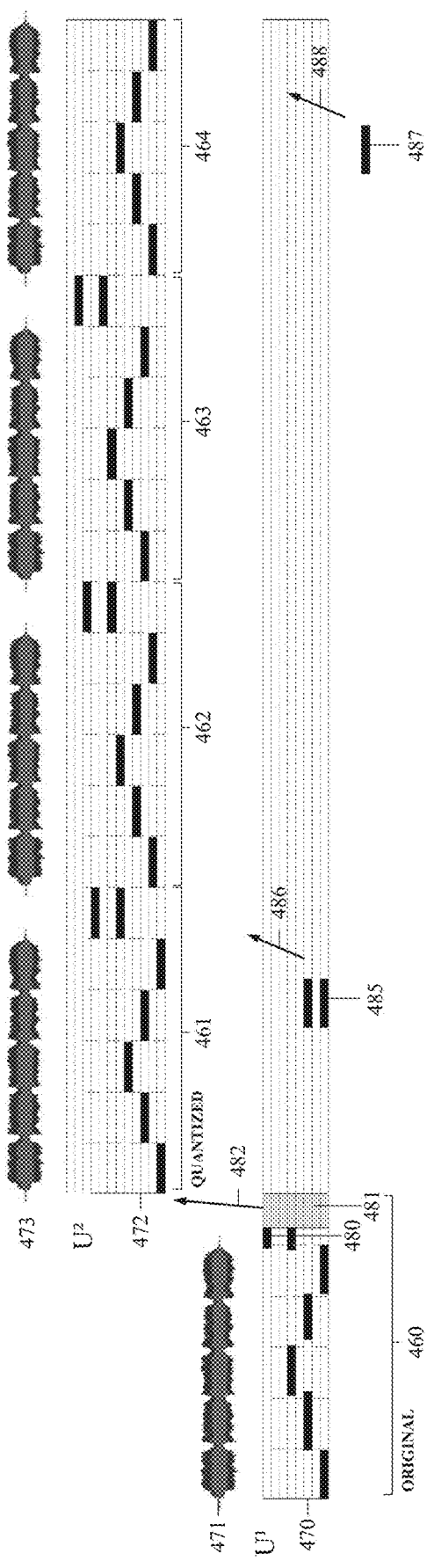
FIG. 4B illustrates an example application of an automated increment and decrement process.

FIG. 4B depicts an example representation of the use of a range command with auto-up, auto-down, and a turnaround of direction depicted using a horizontal passage of time representation. The original musical pattern exercise, as played on instrument 100, starting time is on the left continuing to the most recent time on the right Following, the quantized version of the musical pattern exercise, as played on instrument 140, is depicted.

The horizontal row 470 depicts the notes played by the instrument 100. The horizontal row 471 depicts an audio stream of user 132 speaking or singing. The horizontal row 472 depicts the notes played by the instrument 140. The horizontal row 473 depicts an audio stream of user 122 singing along with the instrument 140 playing the exercise and absolute key change chord. The original vocal exercise pattern 460 and the original absolute key change pattern 480 are first played by user 132 on the instrument 100.

The passage of time 481, from when the computing device 102 detects the exercise and absolute key change pattern to the time when they are played by the instrument 140, is depicted. At time 482, the processing of the musical pattern and transmission of the musical pattern from the instrument 100 to the instrument 140 occurs. The quantized version of the exercise pattern 461 is received by the computing device 124, and used to play the instrument 140 at user 122's location.

In this example, the system is operating with the auto-up setting. During the first repetition of the exercise pattern 461, the system increases the repetition by the specified ascending interval, in this case a semitone, when playing the instrument 140. The subsequent instrument command, a key range command 485, is specified using two keyboard keys (optionally two keyboard note keys pressed at the same time) which respectively set the lowest note boundary and the highest note boundary of the absolute key of the exercise.

In the illustrated example, key range command starts in the key of C and spans 3 semitones from C to D, a major second. The instrument command is transmitted 486 via the network from the computing device 102 to the computing device 124. The instrument 140 plays the exercise pattern and absolute key change chord using the auto-up setting increasing by the ascending interval in note sequences 462 and 463. In note sequence 463, the top boundary note of the key range command reached. In this example, the playing does not stop. Instead, the instrument 140 continues to play in a descending direction, because the command setting commanded that the direction be switch when the boundary note is reached.

For example, a user interface may be provided that enables the user to set a boundary note, and to specify that the playing should stop once the boundary note is reached (as previously discussed with respect to FIG. 4A) or that playing is to change directions (as previously discussed with respect to FIG. 4B).

At 464, instrument 140 plays the exercise in the absolute key starting at the key reached during the top note boundary and decreasing by the specified descending interval, in this case a semitone. The exercise, at 464, descends down a semitone, in this example the key of C#. Another subsequent instrument command 487 is executed as a stop command. The exact note or key corresponding to instrument command 487 is not shown. Optionally, a given instrument command (e.g., a "stop command") may be assigned to a note key on the instrument, a computer keyboard key, or other input device. The instrument command is transmitted 488 via the network from the computing device 102 to the computing device 124. The instrument 140 stops playing after receiving the stop command.

FIG. 5 illustrates an example exercise detection process which may be executed by computing device 102 of user 132 (e.g., an instructor) to capture vocal exercise patterns and absolute key change patterns. The process starts at block 502. At block 504, the process enters into a local playing mode for the playing of the instructor's instrument 100. The process detects an activation of a start control by the user 132 (e.g., where the start control may be assigned via a user interface to any note on the musical instrument 100, and where the start control activation may be in the form of a corresponding musical instrument input for the given instrument type, such as the pressing of specific note key of a piano/keyboard, a strum on a guitar, a pluck of a violin string, playing of a horn, a beat on a drum, or the like), and at block 508, the user's playing of the instrument 100 is recorded. By way of further example, the start control may be assigned via a user interface to an instrument note key (or, for a wind instrument, a certain string or note), a dedicated key, or other selected key or control.

Optionally, local playing may be initiated and/or recorded even when the start control is not manually activated. For example, a user interface may enable a user to specify that the playing should start after a specified time interval upon receipt of a stop command. Optionally, the user may skip activation of the start control and not wait for the time interval, and enter directly into a recording process 508 after the stop control is activated.

At block 506, process performs local exercise pattern detection, where the note sequence being played by user 132 is captured and stored in memory. Optionally at block 508, at any time during the recording, if user 132 wishes to stop the recording the user can activate the stop control, the activation will be detected by the process and will return to the local playing block 504, and optionally clear the recording from memory. At block 510, the process captures the note sequence, and identifies/detects if an absolute key change pattern has been played.

For example, the detection process may monitor incoming events, notes, and/or chords to detect any key change patterns indicating the end of the exercise pattern (e.g., by comparing the played notes and chords with stored MIDI sequence patterns, which may, for example, contain triads, chords, octave chords, or two octave chords) or other event patterns to signal the end of the playing. At block 512, process detects the tempo of the exercise (the rate of speed of the exercise). Optionally, at block 514, the original exercise pattern may be quantized to correct any timing or playing mistakes in the performance by user 132, as illustrated in FIG. 3. At block 516, the assembled instructions containing the exercise pattern, absolute key change pattern, and tempo are transmitted by the computing device 102 to the computing device 124 for playback by instrument 140.

At block 518, the process enters into a local playing controls—remote playing mode, which enables user 132 to control in real time the remote instrument 140 of user 122. For example, in the local playing controls—remote playing mode, the process can receive a transpose exercise note command, at block 526, which may be, by way of example, in the form of the user 132 activating/pressing the next note of the tonic in the absolute key into which to modulate. In this manner, user 132 can transpose the exercise pattern as played on the remote instrument 140 from the original key to a desired absolute key as the playing of the exercise pattern optionally loops continuously on the instrument 140.

At block 520, when user 132 decides to stop the exercise, the user 132 may activate a stop control (which may be in the form of an instrument string, a keyboard note key, blowing a certain note on a wind instrument, striking a drum pad or cymbal, etc.) on instrument 100 which is received by computing device 102. Computing device 102 in turn transmits a stop exercise note to the computing device 124, which in turn causes the instrument 140 to stop playing the exercise.

At block 522, when user 132 decides to pause the exercise, the user 132 may activate a pause control (which may be in the form of an instrument string, a keyboard note key, blowing a certain note on a wind instrument, striking a drum pad or cymbal, etc.) on instrument 100 which is received by computing device 102. Computing device 102 in turn transmits a pause (e.g., in the form of note) to the computing device 124, which in turn causes the instrument 140 to pause the playing the exercise.

User 132 can cause the last exercise to be repeated by activating, at block 524, a repeat control (e.g., an assigned keyboard note key) on instrument 100 which is received by computing device 102. Computing device 102 in turn transmits a remote command (which may be in the form of a note) to the computing device 124, which in turn causes the instrument 140 to replay the last exercise.

Other additional sequencer commands <Commands> may be triggered, at block 524, by the user activating the corresponding assigned key (or string or other suitable instrument input depending on the instrument type) including, by way of example: a range command, auto play—direction up, auto play—direction down, increase iteration count, decrease iteration count, etc. As discussed elsewhere herein, the range command optionally is provided via the pressing of two keys at the same time during the command mode to set the lowest absolute key and highest absolute key for the iterations of the exercise to occur within. The exercise will move to the lowest note absolute key during the next iteration and proceed in the auto play direction (e.g., either increasing or decreasing by semitone) until the highest note absolute key is reached. The auto play direction up command (e.g., which may be assigned to an instrument key) sets the direction of the auto-play to be up by, for example, a semitone. The auto play direction down key sets the direction of the auto-play to be down by, for example, a semitone. The increase and decrease iteration count increases or decreases, respectively, the iteration count (if set) of the number of iterations remaining to play the exercise.

Figure 6:
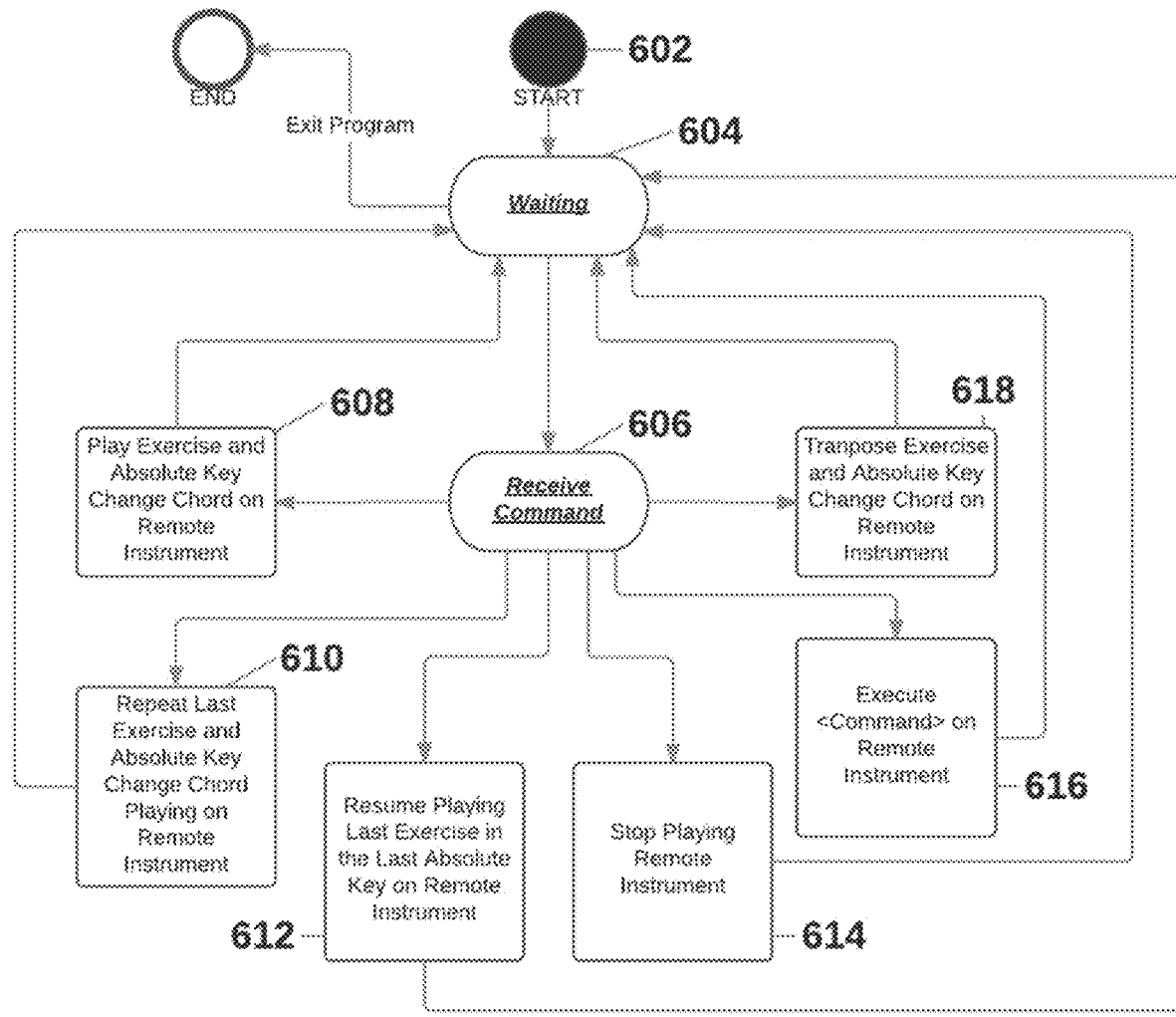
FIG. 6 illustrates an example command execution process.

FIG. 6 illustrates an example process, which may be executed by the computing device 124 of the user 122 (e.g., a student). At block 602, the process starts and is initialized. At block 604, the process enters a wait state. At block 606, upon a receiving an instrument command from computing device 102, the computing device 124 causes the instrument 140 to act with respect to a musical exercise in accordance with the command. Examples of the instrument commands may include, for example, start, stop, pause, resume, repeat, transpose, other commands disclosed herein, and/or other commands.

At block 608, a play instrument command is received from the remote computing device 102. The play instrument command may include a play exercise command and/or an absolute change cord command. For example, the play instrument command may be used to set the exercise pattern played on the instrument 140, which may be, by way of example, the original exercise pattern as played by user 132, or a quantized exercise pattern followed by the absolute key change pattern.

At block 618, the transpose command is received from the remote computing device 102. The transpose command sets a new absolute key change to begin at the next absolute key change pattern played immediately prior to the next repetition of the exercise pattern. At block 614, the stop command is received from the remote computing device 102. The stop command stops the playing of the exercise by the instrument 140 at the end of the current exercise pattern. The option to stop the current exercise immediately without finishing the pattern is optionally provided.

At block 610, the repeat command is received from the remote computing device 102. The repeat command causes the instrument 140 to repeat the playing of the last exercise pattern and absolute key change pattern in the original key it was transmitted in. The pause command may be received from the remote computing device 102. The pause command causes the instrument 140 to immediately stop playing the exercise and stores the last absolute key the exercise was played in. At block 612, the resume command is received from the remote computing device 102. The resume command causes the stored the last absolute key the exercise was played in to be accessed from memory, and causes the instrument 140 to start playing the paused exercised in the accessed last absolute key the exercise was being playing in. Other additional commands <Commands> may be received, at block 616, for execution by the computing device 124 and/or instrument 140. Such commands may include, by way of example: a range command, auto play—direction up, auto play—direction down, increase iteration count, decrease iteration count, etc.

Figure 7:
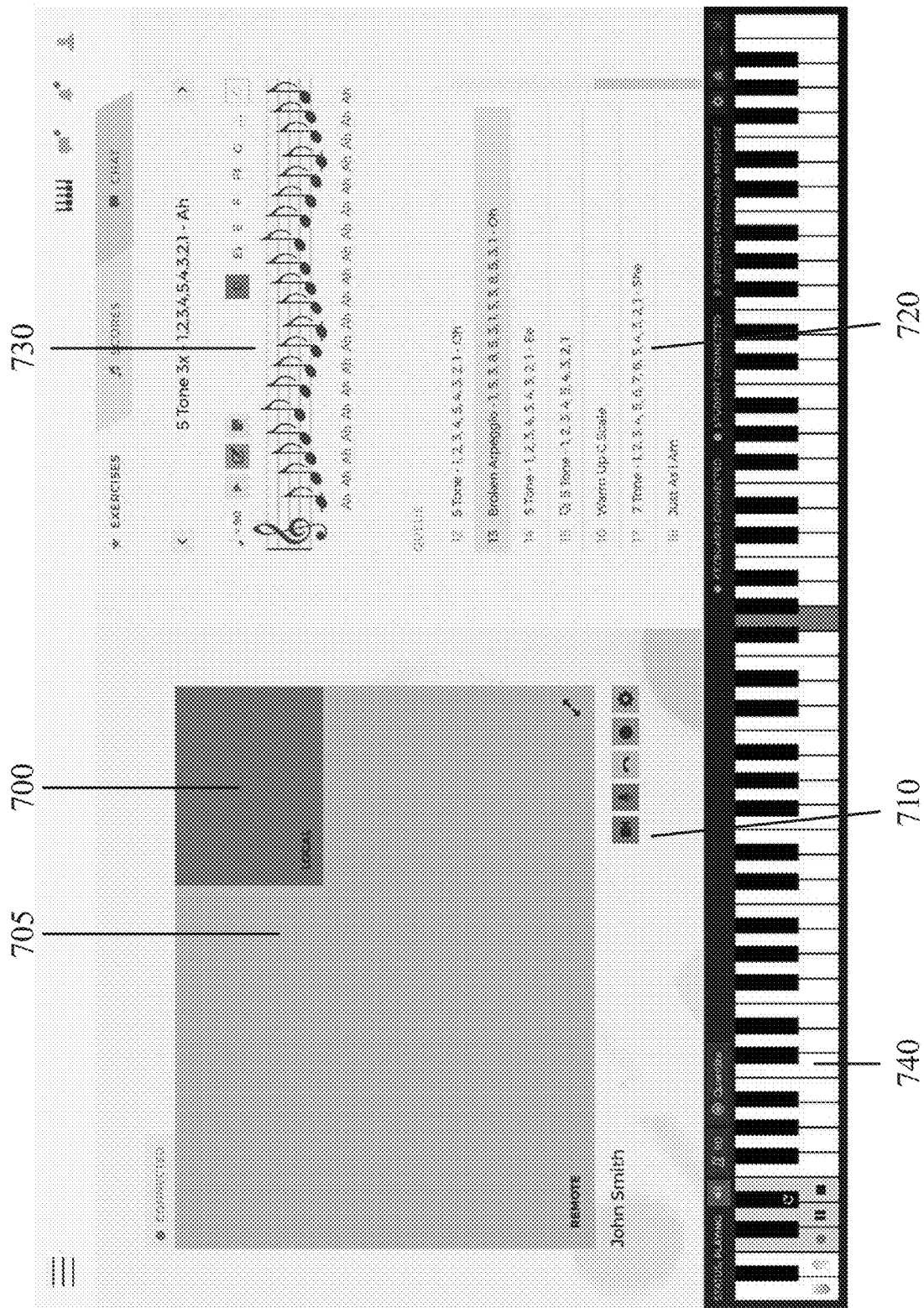
FIG. 7 illustrates an example interface of a lesson player.

FIG. 7 depicts an example user interface that may be presented on a user device display (e.g., of computing devices 102 or 124) via a Web browser or other application. This user interface (as well as other user interfaces described herein) may be accessed by computing devices 102 or 124 from a cloud system or may be generated by an application hosted on computing devices 102 or 124. The user interface includes a local video pane 700 that displays the video of the user captured by the user's video camera. A remote video pane 705 displays video content (e.g., of the remote user) from the remote user's video camera (which may be synchronized with audio content received from the remote user's computing device).

Multiple user accessible controls 710 are provided. A control is optionally provided that enables the user to disable or enable the transmission of video content from the user's video camera to the remote user's computing device. If the user so displays the transmission of video content, the remote video pane on the other user's display may display, by way of example, a blank screen, black screen, or placeholder image. A control is optionally provided that enables the user to disable (mute) or enable the transmission of audio content from the user's microphone to the remote user's computing device. A control may be provided that enables a user to begin or end a recording of video and/or audio content transmitted between the users. A start call may be transmitted that enables a user to initiate a video and/or audio call with another user.

Optionally, a music player pane 730 is provided that depicts the current exercise pattern (e.g., using musical notation), absolute key change pattern, and current key, which may be generated from music commands (e.g., MIDI commands) from a user instrument or from a file of such commands. The exercise pattern may optionally be a song track. The user interface may optionally display associated lyrics, vowels, and/or consonants. Optionally, the music player pane 730 may not show individual notes from a given pattern and instead display only the range of the notes for the highest and lowest notes. Optionally, the user interface may animate the actively playing note on the musical notation. The user interface optionally renders graphical animations with respect to the music notation that represent the notes in a highlighted color or using other emphasis (e.g., bolding) as they are being played. The musical notation may be scrolled horizontally and/or vertically to keep the current area of musical staff, measures, and notes in view. The musical notation optionally provides visible updates to the key changes by redrawing the appropriate staff and key signature as the absolute key changes are made.

Optionally, an instrument viewer pane 740 is provided that depicts the layout of an instrument (e.g., a keyboard in this example) and animates (with a highlighting color or otherwise) the user instrument input (press of a keyboard key, striking of a percussion instrument with a drum sticks) while the exercise is played. Optionally, a menu of instrument types may be presented via which the user can select what instrument is to be presented and animated in the instrument viewer pane 740. The animations of the instrument being played may show notes in different colors or utilize motion (e.g., a pressed key being moved done, and upon release, up) to give the appearance of the musical instrument being played. A control is optionally provided via which the user can command to the user interface to display or hide the instrument viewer pane 740 and/or the music notation pane 730. Optionally, a control may be provided for a user (e.g., an instructor) to control whether the instrument viewer pane 740 and/or the music notation pane 730 are displayed to the other user (e.g., a student) on the other users display.

Optionally, an exercise history pane 720 is provided that depicts a list of previous exercise patterns in a vertical scrolling manner, optionally with the most recently played exercise at the top. Optionally, in addition to or instead of an exercise history pane 720, a queue may be displayed that lists previous exercises and upcoming scheduled exercises, musical accompaniments, and/or songs.

Figure 8:
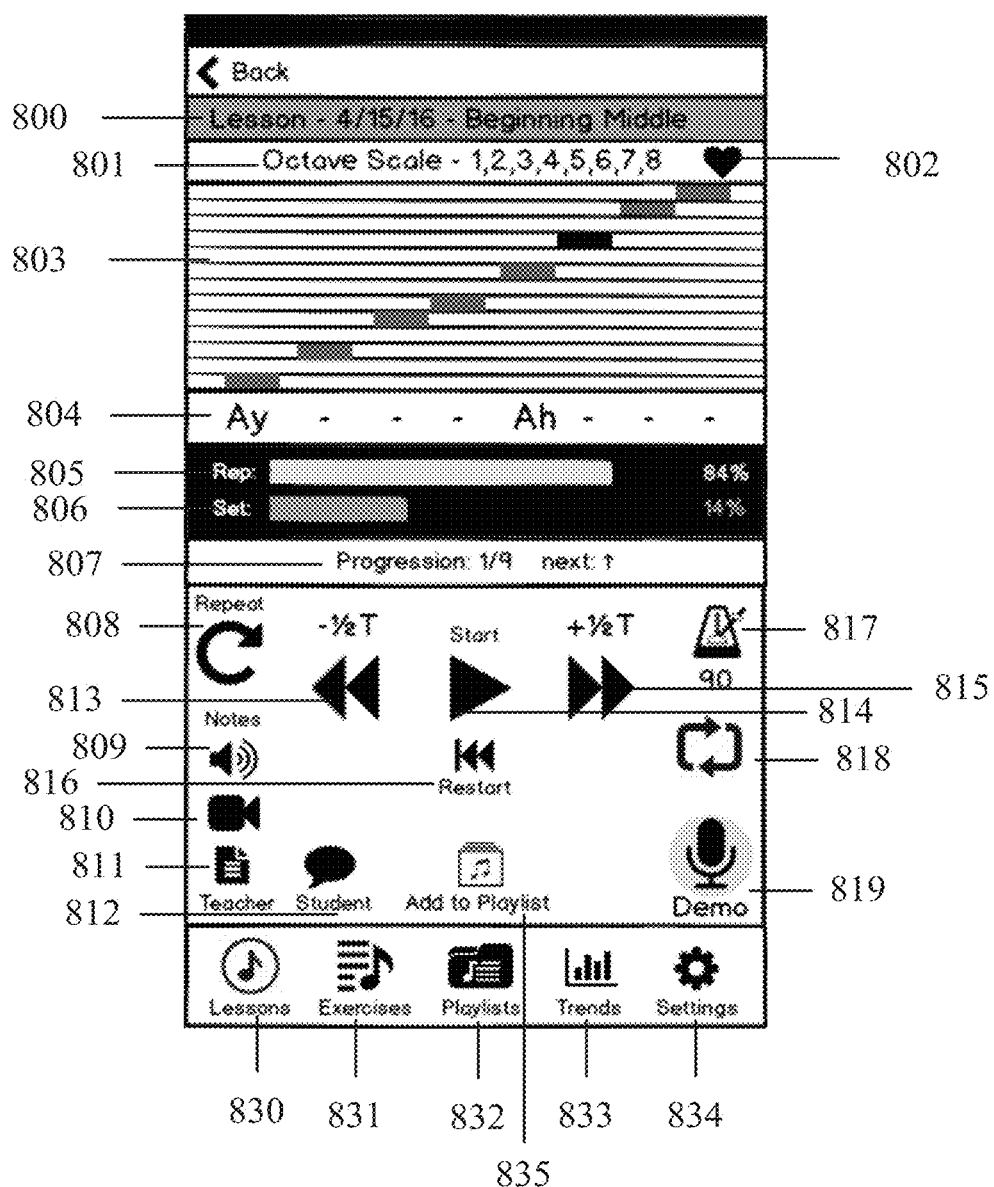
FIG. 8 illustrates an example interface of an exercise player.

FIG. 8 illustrates is an example user interface that may be utilized in conjunction with the playback of recorded musical patterns (e.g., recorded during real-time playing or non-real-time recording sessions). The user interface may be formatted for a mobile device, such as a smart phone or tablet. A session group name field 800 is optionally provided that displays an indication as which group the currently selected/playing musical pattern belongs. A musical pattern name field 801 is optionally provided that displays the musical pattern name. A favorite feature interface 802 is optionally provided (e.g., in the form of an icon (e.g., heart, star, or other)), which when activated by a user, causes the currently playing musical pattern to be added to a favorite list of the user for later access by the user.

A horizontal pitch notation pane 803, with note sequence, sometimes referred to as a piano roll, may optionally be displayed to represent the notes contained within the currently playing or selected musical pattern. Optionally, the horizontal pitch notation pane 803 may be animated using one or more techniques. One example animation technique may highlight the actively playing note of the musical pattern in a certain color (different than the color of other notes) or by bolding while keeping the notes in place. Optionally, all of the notes are resized to fit within the display area and animated in place. Optionally instead, the notes may scroll (e.g., from right to left) and optionally the current note being played may be highlighted (e.g., using color or bolding).

Optionally, a word pane is provided that displays text, vowels, consonants, or words, if the musical pattern being played contains such data. The word pane may be used to guide a vocal exercise. For example, the illustrated example displays the vowels Ay and Aw and indicates which note to sing what vowel on. Optionally, a repetition progress indicator 805 is provided that depicts the percentage of progress of playing the current repetition of the exercise using a horizontal or vertical bar and/or a numerical percentage (e.g., an integer) with percent sign. Optionally, a set progress indicator 806 is provided that depicts the percentage of progress of playing the current set (e.g., where a set is the entire repetitions being comprised of the exercise pattern and absolute key change chord repetitions along with any subsequent instrument instructions) of the exercise and and/or a numerical percentage (e.g., an integer) with percent sign.

An optional progression indicator 807 is provided that depicts the current iteration count of the playing of the current musical pattern. An optional sound icon 809 is provided that indicates if an audio example, instruction, or other message is provided for the current musical pattern. Selecting the sound icon 809 causes the corresponding audio example, instruction or other message to be played to the user. An optional video icon 810 is provided that indicates if a video example, instruction, or other message is provided for the current musical pattern. Selecting the video icon 810 will cause the corresponding video to be played. Optionally, a video interface is provided that enables the user to view a live recording of the musical pattern if the musical pattern is being streamed live to the user's computing device.

Optionally, a notes icon 811 is provided that when selected causes notes to or from users to be presented. Optionally, a comment icon 812 is provided that enables a user (e.g., a student) to leave any notes, comments, feedback, or messages to the other user (e.g., the instructor) for each musical pattern. Optionally, a rewind control 813 is provided that when selected causes the musical pattern to be transposed down by the descending interval, in this case −½ means down a semitone, and played back. Optionally, a play control 814 is provided that when selected causes the currently playing musical pattern to play or be paused. Optionally, a fast forward is provided 815 that when selected causes the musical pattern to be transposed up by the ascending interval, in this case +½ means up a semitone.

Optionally, a restart control 816 is provided that when activated resets playing by the remote instrument (e.g., the student's instrument) to the beginning of the current musical pattern settings. Optionally, a tempo control 817 is provided that when activated enables the user to change (e.g., increase or decrease) or override the current tempo for the current musical pattern. Optionally, an auto-next control 818 is provided that when activated enables the user to instruct the system to automatically progress between musical patterns with an optional delay or beats between the patterns so that the remote user (e.g., a student) can automatically progress from musical pattern to musical Pattern within the current session.

A demo control 819 is optionally provided that, when activated, enables the user (e.g., an instructor) to start recording audio and/or video of the remote user (e.g., a student) singing along with the playing of the instrument 140. The recording may be stored locally on the remote computing device of the remote user to be transmitted over the network to the user's computing device and/or a cloud system which the user can access and playback at a later time.

An optional navigation menu is provided via which the user to navigate around within the various user interface to locate, view, and play various sessions, sets, and musical patterns. Activation of a lessons control 830 by the user causes an optional user interface to be presented that lists the sessions available for access. Activation of an exercises control 831 causes an optional user interface be presented that lists the musical patterns available for access. Activation of a playlists control 832 causes an optional user interface be presented that lists the playlists and "favorited" musical patterns available for access. Activation of a trends control 833 causes an optional user interface be presented that displays usage and metrics regarding playback of musical exercises. The trend user interface optionally provides counters and/or timers to track the number of plays, repetitions, and time spent using the system. Activation of a settings control 834 causes a settings user interface to be presented which enables the control any user accessible settings. Optionally, some of the described visual elements may be minimized/hidden or maximized/displayed to maximize available screen pace or keep exercise player options to a minimum.

FIG. 9 is an example of a user interface that be utilized to create and store exercises into an exercise library. For example, the user interface may optionally be presented to a user that is an instructor, and may be used to interact with a remote computing device and remote instrument of a student. The exercise name 900 of the current exercise 910 is displayed and can be changed or edited. The user can also select a different exercise whose name with then be displayed. Controls 902 are provided for the tempo, play/pause, and settings for the current exercise. The tempo can be changed, edited, or a new tempo can be created (e.g., by activating an up or down tempo control or my inserting or selecting a numerical tempo). The play control enables the user to initiate playback of the recorded exercise for review. The pause control is displayed when the exercise is playing, where activation of the pause control pauses the playing of the exercise. Activation of the settings control causes an advanced settings user interface to be presented which enables the user to control the ascending interval, descending interval, and other options for the exercise.

The exercise 910, in this example, is rendered in traditional music notation format. Optionally, the exercise may be shown in a pitch notation without the music staff or lines. The start pitch and end pitch 915 are displayed to indicate what the starting pitch and ending pitch of the exercise repetition will be performed in. The exercise may optionally have tags 930 associated with it for categorization, grouping, or cataloging within the library. The user interface may enable the user to add tags may entering the tags in a tag field and activating an enter control. An optional video locator (e.g., a URL) 940 may be provided to link an introduction, demonstration, or performance of the exercise. The video hosting provider may be any third party video host (e.g., YouTube, Vimeo, Wistia, Brightcove, etc.) or self-hosted video system. The video may be displayed via a video player in a video playback area.

A virtual musical instrument 950, in this example shown as a piano keyboard, is a visual display of the musical instrument of the user that is connected to the system. An optional musical instrument control 951 enables the user to toggle showing or hiding the virtual musical instrument. Optionally, the virtual musical instrument 950 mirrors the physical instrument that is coupled to the computing device, so that pressing a note on the physical keyboard will cause the user interface to highlight the corresponding key on the virtual musical instrument 950. Optionally, the computing device may simulate the musical instrument and the user may interact with the system using the virtual musical instrument 950. The list of exercises within an exercise library 960 may be displayed, where a given listing is presented in association with a play control, an exercise name, beats per minute (bpm) for the exercise, and associated tags. Activation of a play control may cause the corresponding exercise to be played, and the associated information (exercise name 900, start key and end key 915, musical notation 910) to be displayed in place of the information of the previously selected exercise.

A search field 961 is provided via which the user can enter a search query to locate matches stored in the music library (where the library may store, for example, vocal exercises, musical accompaniments, and/or songs). For example, a search engine may attempt to match the query to by name and/or tag, and provide the search results for display to the user. Optionally, various metadata fields may be added to make searching and visualizing the vocal exercises, musical accompaniments, and/or songs in the music library easier.

The musical instrument digital keyboard may include several command controls, which may be assigned to virtual keyboard keys, as illustrated. A tempo up control 970 and tempo down control 971 enable the user to increase or decrease the tempo respectively. Activation of a record control 972 initiates the recording, by the user's computing device, of the coupled musical instrument. Activation of a pause control 973 causes the immediate cessation of the remote musical instrument. Activation of a restart control 974 initiates the playing of a just played exercise again on the remote musical instrument. If the restart control 974 was activated after activation of the stop control 975, then the exercise begins playing in the original absolute key. Activation of the stop control 975 causes remote instrument to stop playing the current exercise at the end of the musical pattern.

In this example, key 976 of the virtual musical instrument 950 is highlighted to indicate the currently playing note. A status indicator 980 displays the state of the keyboard mode (e.g., listening, recording, playing, paused, stopped and/or other status, such as those discussed herein). Activation of a sound toggle control 981 mutes or unmutes the sound for the virtual keyboard instrument. The user interface may further display the tempo 982 of the last detected exercise. Activation of a quantize toggle control 983 enables the user to enable or disable use of the quantization process described elsewhere herein. Status indicators 985, 986, 987 respectively indicate the connected status for the local instrument (keyboard in this example) and the student/remote keyboard, and indicates whether a keyboard message is received. An setting is optionally provided which when activated causes a user interface to be presented for controlling internal settings within the network musical instrument.

FIG. 10 illustrates an example session history user interface. The example user interface lists session dates 1000 and the vocal exercises utilized during the session (e.g., for instructing a student). The user interface enables a user to select a specific session date, and in response, the history of the selected session is accessed and presented to the user. In this example, a vertical column displays a list of vocal exercises, musical accompaniments, and/or songs starting with the top item 1005 ("08 5 Tone—1,2,3,4,5,4,3,2,1—Ah"). Related information for given historical exercise may be accessed and presented, such as like tempo, starting note, ending note, musical notation, lyrics, and notes. Optionally, a control is provided via which the user can toggle the display of such information on or off. The user may select other listed historical exercises whose information will then be displayed in the place of the initially presented exercise information.

A vocal exercise, musical accompaniment, or song player user interface 1010 provides controls via which the user can set the play the record and optionally change exercise tempo, play/pause the exercise, edit a selected exercise, and/or add notes for storage and later access. For example, information 1020 may be accessed and presented that includes the starting absolute key, absolute key changes and ending absolute key for the exercise. User entered notes 1020 may be accessed and displayed. The notes may have been entered by the local user (e.g., the instructor) and/or the remote user (e.g., the student). A media player 1050 may display a video recording of the selected session and may playback in synchronization an associated recorded audio track.

FIG. 11 illustrates an example library view user interface. A list 1101 of items in a library may be accessed and presented. A search field 1100 is provided via which the user can enter a search term (e.g., name, artist, tag, or metadata). A search engine will receive the search query and identify and present matching library items. Optionally, the user interface utilizes different icons to represent different categories of items in the library. For example, the user interface may utilize an exercise icon 1102, a song icon 1103, a personal content icon 1104, or a system library icon 1105 to indicate respective categories.

Optionally, the user may build a session by selecting listed exercises and adding them to a queue 1170. Optionally, the user interface provides a viewer that enable the user to view (e.g., in musical notation) and play the currently selected item. The viewer may optionally contain a previous control 1106 and next control 1118 control to move backward or forward through items in the queue. A tempo user interface 1107 display the current tempo and enables the user to change the tempo for the associated exercise (e.g., by using tempo up and down controls or by entering a tempo number). Activation of a play/pause control 1108 enables the user to play or pause the exercise. An edit lyrics interface 1109 enables the user to edit the lyrics, words, or vowels to be sung with the exercise, where the edited lyrics may be stored for later display during playing of the exercise.

A notes control 1110, when activated, toggles on the notes text input box to save any notes or comments with the exercise. An exercise name 1111 is displayed for the currently selected item. An optional musical notation 1112 for the exercise may be shown in standard musical staff notation, pitch notation or other music format. The starting absolute key, subsequent absolute key changes, and ending absolute key may be shown in the horizontal format field 1113. The user interface may optionally display or hide the virtual musical instrument 1150 in response to a user activating the optional musical instrument control 1105.

FIG. 12 illustrates an example recommendation user interface that generates and displays several lists based on the user's usage of the system and historical utilization of exercises. A recently created list 1200 horizontally displays vocal exercises, musical accompaniments, and songs that have been recently (e.g., within a predefined period or user selected period, such as the last week, the last year, or other time frame) added to the system library by the user. A popular songs list 1201 displays several popular songs the user has been playing during sessions (e.g., a predetermined or user specified number of the top most popular songs, as ranked based on the number of times the songs have been used in a session within a specified period of time, such as the last week, month, or other time frame, or overall). A popular exercises list 1202 displays several popular vocal exercises the user has played during sessions (e.g., a predetermined or user specified number of the top most popular exercises, as ranked based on the number of times the exercises have been used in a session within a specified period of time, such as the last week, month, or other time frame, or overall). A list 1203 displays vocal exercises and songs that have not been played with a remote user (e.g., a student) within a specified period of time (e.g., within the last month). Other examples of user configurable filters that may be provided and that may be used to generate lists include by users, song type, genre, exercise tag, exercise metadata, or any other filter criteria that may be used to generate relevant and useful recommendations.

A video control 1220, when activated, replaces the left panel of recommendations with a VOIP session interface enabling a communication session to be conducted with a remote user. A recommend control 1221, when activated replaces the left panel with the recommendation lists. A library control 1222, when activated, replaces the left panel with a library interface similar to that discussed elsewhere herein. A "Create New+" control 1223, when activated, replaces the left panel with a user interface that enables a user interface to add new items to the library. A queue listing 1230 displays items that have been added to the user's queue as similarly discussed elsewhere herein. A session name field 1224 display an optional name that can be given to the session name for a future or historical session. An end control 1225, when activated, terminates the current session.

FIG. 13 illustrates an example search and match process. The process begins at block 1302. At block 1304, after an exercise has been captured or uploaded to the system library, the exercise is analyzed. For example, at block 1306, for the note pattern and pitch pattern are analyzed. At block 1308, the tempo is detected and determined. At block 1310, the rhythm is detected and determined. At block 1312, the intensity is analyzed and determined. Optionally, additional criteria (e.g., metadata, vowel selection, phonemes, last used, recently used, popularity) may be used to characterize and identify the pattern. The result of the analysis may optionally create a unique identifier for the exercise in the form of an electronic fingerprint or signature. One example fingerprint may be generated by compiling the note pattern on the exercise (e.g., Do-Re-Mi-Re-Do) to create the first part of the fingerprint (e.g., 01-03-05-03-01) wherein the pitches in the exercise are referenced in a relative format based on their relationship to the tonic in a two-digit string. Similarly, a scale Do-Mi-Sol-Mi-Do would become 01-04-07-04-01.

By way of further example, absolute matching may be utilized, where MIDI values (or other music value vocabulary) corresponding to the exercise are compared to MIDI values (or other music value vocabulary) of other musical compositions or sequences, and similar matches are identified. Optionally, the relative format may be converted to the MIDI format. By way of illustration, 01-03-05-03-01 (corresponding to Do-Re-Mi-Re-Do) from the previous example may be converted to the MIDI values of 48-50-52-50-48, and 01-04-07-04-01 (corresponding to Do-Mi-Sol-Mi-Do) may be converted into the MIDI values of 48-52-55-52-48. The values of 48-52-55-52-48 may be identified as being similar to 48-50-52-50-48 for matching purposes.

The tempo is optionally detected by counting the number of notes played based on the current pulse or rhythm within a given period of time to get the beat per minute (bpm). The tempo information is also appended to the fingerprint (e.g., using concatenation). The rhythm information may be determined by making a list of starting playing times for notes and identifying the interval between start times. The intensity information is determined (indicating how hard notes are being player, such as loudly or softly) by making a list of intensities for each note playing. The rhythm information and intensity information are also included in the fingerprint.

Once the analysis is complete, at block 1314, the process searches the library for similar exercises with similarly electronic fingerprints. The search optionally only identifies a match if the fingerprint have a specified threshold of similarities. The match threshold may initially set at 100%. At block 1316, a determination is made as to whether there are a sufficient threshold number of matches. If there are not a threshold number of matches, at block 1318, the match threshold may be adjusted downward by a set increment (e.g., 0.01%) until a threshold number of matches are found.

At block 1320, a determination is made as to whether multiple matches have been identified. If multiple matches have been identified then, at block 1322, the process can optionally return the first or closest match and/or the most recently played item as the match. If only one match is identified then that match is returned at block 1326. If, at block 1324, a determination is made that no matches have been found then a guess is returned based on a 95% match rule or by identifying the most commonly matched exercise based on the supplied criteria.

Figure 14:
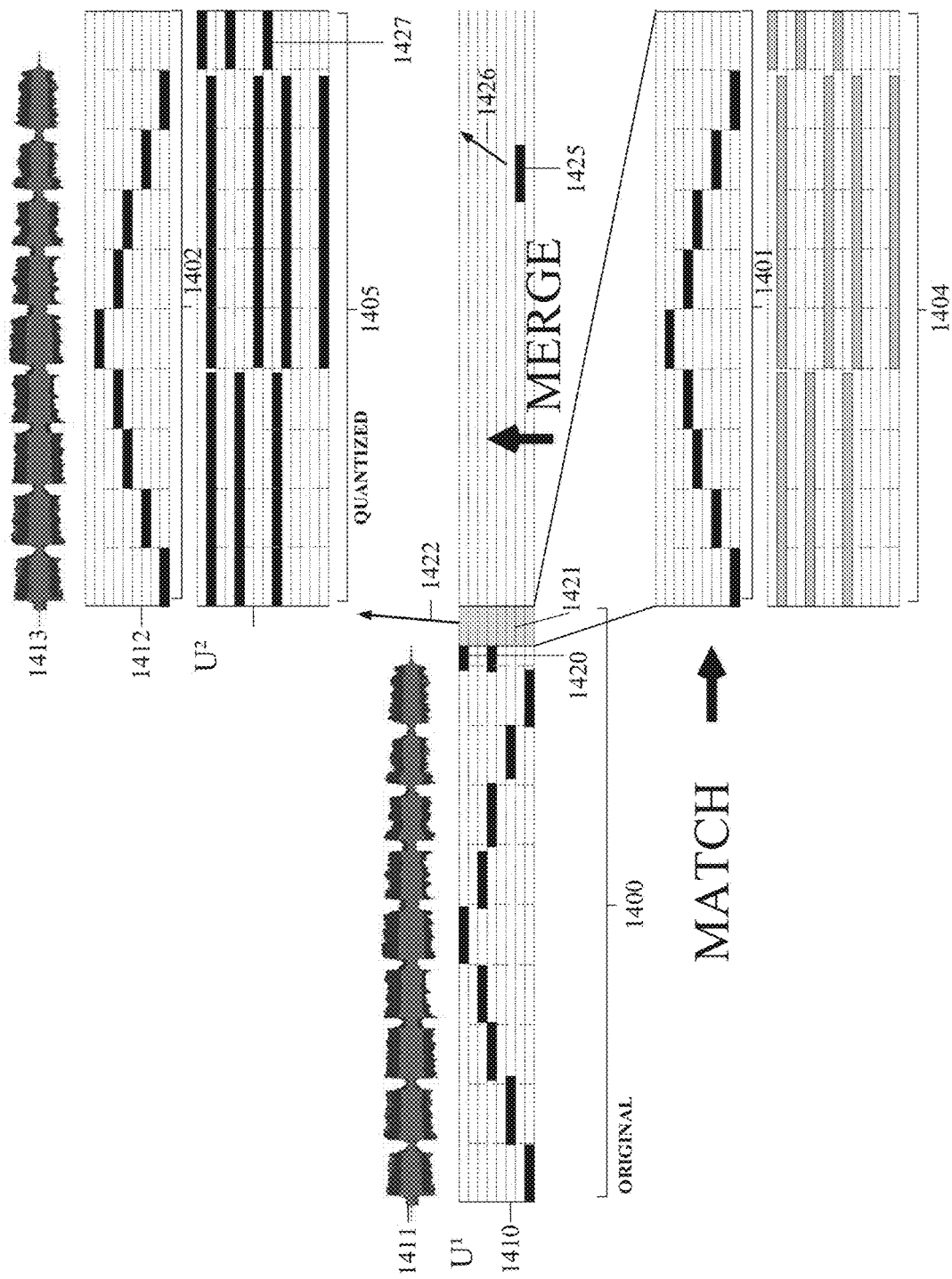
FIG. 14 illustrates an example match and merge process.

FIG. 14 illustrates an example match and merge process. In the illustrated example, the match and merge process plays a simple major scale 1-2-3-4-5-4-3-2-1, which is match to a similar musical pattern from the library wherein the matched musical pattern also contains an additional music track for the underlying chord in the Roman numeral format of (I-V-I), where the I chord is playing during the 1-2-3-4 and changes to the (V) chord on the 5-4-3-2 and then back to I on the 1, and optionally contains a key change chord to the subsequent absolute key. Other non-limiting examples may occur in Jazz, for example, where a scale is played, detected, and merged with an underlying chord progression harmony as the musical accompaniment like playing a (iim7-V7-Imaj7) under a dominant bebop scale or minor bebop scale or a (iim7b5-V7alt-im7) under a harmonic minor bebop scale. The matched musical pattern may optionally contain the metadata of the chord progression for the chords in relative or absolute formats which can be displayed via the user interface and the subsequent absolute key changes displayed in either Roman Numeral format or the Chord Letter format.

In the illustrated example, a horizontal passage of time is depicted with the starting time on the left continuing to the most recent time on the right for the original pattern as played on the instrument 100 (e.g., the instructor instrument) continuing on to the quantized version of the original pattern as to be played by the instrument 140 (e.g., the student instrument). The view shows an example of how the detection and transmission of vocal exercises and absolute key change patterns occur without a human-perceptible delay of time. The horizontal row 1410 depicts the notes played by the instrument 100. The horizontal row 1411 depicts an audio stream of the user 132 of instrument 100 (e.g., the instructor) speaking or singing. The horizontal row 1412 depicts the notes played by the instrument 140. The horizontal row 1413 depicts an audio stream of user 122 (e.g., a student) singing along with the instrument 140 playing the exercise and absolute key change chord.

An example of the original vocal exercise pattern 1400 and the original absolute key change pattern 1420 are first played by user 132 on the instrument 100. The passage of time from when the computing device 102 detects the exercise and absolute key change pattern to the time when they are played by the instrument 140 occurs at time period 1421. The processing and transmission from the instrument 100 to the instrument 140 occurs during time period 1422. An exploded version of period 1422 is shown where, during the processing, the matching process has identified the exercise pattern 1401 along with the additional musical accompaniment chords 1404. A merge process is applied and the musical accompaniment chords are merged into the final exercise pattern which is transmitted during period 1422. The quantized version of the exercise pattern 1402 and the chord musical accompaniment 1405 is received by the computing device 124 and played via the instrument 140 at user 122's location.

A transpose exercise note command 1425, an example of an instrument command, is played by user 132 on the instrument 100 to transpose the next repetition of the remote playing of the exercise on the instrument 140. Other example commands 1425 optionally include transpose, pause, resume, repeat, stop, range, tempo, automated direction, or other command. When a transpose exercise note command is received by the computing device 124 from instrument 100 before the playing of the next absolute key change pattern, the transposition to the new absolute key transmitted from the instrument 100 to the instrument 140 is set. The transmission of the transpose exercise note command from the instrument 100 to the instrument 140 occurs at 1426. The absolute key change chord 1427 is played in the new absolute key on the instrument 140.

Thus, described herein is a system that optionally comprises some or all of the following components: a network musical instrument that may be used for playing vocal exercises over a network, including local instrument (e.g., with respect to an instructor), a local computing device, a local transducing device, a local audio playback device, a local video camera, program code configured to implement an exercise detection process and to establish a communication channel between local and remote computing devices and instrument, a remote audio playback device, a remote transducing device, and a remote video camera. The foregoing components may be utilized to create a vocal exercise projection loop useable for real-time vocal exercises optionally without any human perceptible delay with respect to the capture of a vocal exercise at one location and the playback of the vocal exercise at a remote exercise. The various components may be implemented in other forms of physical hardware and software that combine or separate the components and include a variety of operating systems, web browsers, and device form factors such as desktops, laptops, tablets, mobile phones, and/or embedded computing devices.

The methods and processes described herein may have fewer or additional steps or states and the steps or states may be performed in a different order. Not all steps or states need to be reached. The methods and processes described herein may be embodied in, and fully or partially automated via, software code modules executed by one or more general purpose computers. The code modules may be stored in any type of computer-readable medium or other computer storage device. Some or all of the methods may alternatively be embodied in whole or in part in specialized computer hardware. The systems described herein may optionally include displays, user input devices (e.g., touchscreen, keyboard, mouse, voice recognition, etc.), network interfaces, etc. The results of the disclosed methods may be stored in any type of computer data repository, such as relational databases and flat file systems that use volatile and/or non-volatile memory (e.g., magnetic disk storage, optical storage, EEPROM and/or solid state RAM).

Those having skill in the art will recognize that the state of the art has progressed to the point where there is little distinction left between hardware and software implementations of aspects of systems; the use of hardware or software is generally (but not always, in that in certain contexts the choice between hardware and software can become significant) a design choice representing cost vs. efficiency tradeoffs. those having skill in the art will appreciate that there are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; alternatively, if flexibility is paramount, the implementer may opt for a mainly software implementation; or, yet again alternatively, the implementer may opt for some combination of hardware, software, and/or firmware. Hence, there are several possible vehicles by which the processes and/or devices and/or other technologies described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary. Those skilled in the art will recognize that optical aspects of implementations will require optically-oriented hardware, software, and or firmware.

The foregoing detailed description has set forth various embodiments of the devices and/or processes via the use of block diagrams, flowcharts, and/or examples. in so far as such block diagrams, flowcharts, and/or examples contain one or more functions and/or operations, it will be understood as notorious by those within the art that each function and/or operation within such block diagrams, flowcharts, or examples can be implemented, individually and/or collectively, by a wide range of hardware, software, firmware, or virtually any combination thereof. in one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in standard integrated circuits, as one or more computer programs running on one or more computers (e. g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and/or firmware would be well within the skill of someone skilled in the art in light of this disclosure. in addition, those skilled in the art will appreciate that the mechanisms of the subject matter described herein are capable of being distributed as a program product in a variety of forms, and that an illustrative embodiment of the subject matter described herein applies equally regardless of the particular type of signal bearing media used to actually carry out the distribution. Examples of signal bearing media include, but are not limited to, the following: recordable type media such as floppy disks, hard disk drives, solid state drives, flash drives, USB memory stick, CD ROMs, DVDs, digital tape, and computer memory; and trans mission type media such as digital and analog communication links using TDM or IP based communication links (e. g., packet links).

The various illustrative logical blocks, modules, routines, and algorithm steps described in connection with the embodiments disclosed herein can be implemented as electronic hardware, computer software, or combinations of both. To clearly illustrate this interchangeability of hardware and software, various illustrative components, blocks, modules, and steps have been described above generally in terms of their functionality. Whether such functionality is implemented as hardware or software depends upon the particular application and design constraints imposed on the overall system. The described functionality can be implemented in varying ways for each particular application, but such implementation decisions should not be interpreted as causing a departure from the scope of the disclosure.

Moreover, the various illustrative logical blocks and modules described in connection with the embodiments disclosed herein can be implemented or performed by a machine, such as a general purpose processor device, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor device can be a microprocessor, but in the alternative, the processor device can be a controller, microcontroller, or state machine, combinations of the same, or the like. A processor device can include electrical circuitry configured to process computer-executable instructions. In another embodiment, a processor device includes an FPGA or other programmable device that performs logic operations without processing computer-executable instructions. A processor device can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor device may also include primarily analog components. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, routine, or algorithm described in connection with the embodiments disclosed herein can be embodied directly in hardware, in a software module executed by a processor device, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An exemplary storage medium can be coupled to the processor device such that the processor device can read information from, and write information to, the storage medium. In the alternative, the storage medium can be integral to the processor device. The processor device and the storage medium can reside in an ASIC. The ASIC can reside in a user terminal. In the alternative, the processor device and the storage medium can reside as discrete components in a user terminal.

In a general sense, those skilled in the art will recognize that the various aspects described herein which can be implemented, individually and/or collectively, by a wide range of hardware, software, firmware, or any combination thereof can be viewed as being composed of various types of "electrical circuitry." Consequently, as used herein "electrical circuitry" includes, but is not limited to, electrical circuitry having at least one discrete electrical circuit, electrical circuitry having at least one integrated circuit, electrical circuitry having at least one application specific integrated circuit, electrical circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), electrical circuitry forming a memory device (e.g., forms of random access memory), and/or electrical circuitry forming a communications device (e.g., a modem, communications switch, or optical-electrical equipment).

The foregoing described aspects depict different components contained within, or connected with, different other components. it is to be understood that such depicted architectures are merely exemplary, and that in fact many other architectures can be implemented which achieve the same functionality. in a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected" or "operably coupled" to each other to achieve the desired functionality.

While particular aspects of the present subject matter described herein have been shown and described, it will be obvious to those skilled in the art that, based upon the teachings herein, changes and modifications may be made without departing from this subject matter described herein and its broader aspects and, therefore, the appended claims are to encompass within their scope all such changes and modifications as are within the true spirit and scope of this subject matter described herein. Furthermore, it is to be understood that the invention is defined by the appended claims. it will be understood by those within the art that, in general, terms used herein, and especially in the appended claims (e.g., bodies of the appended claims) are generally intended as "open" terms (e. g., the term "including" should be interpreted as "including but not limited to," the term "having" should be interpreted as "having at least," the term "includes" should be interpreted as "includes but is not limited to," etc.). it will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should NOT be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" and/or "one or more"); the same holds true for the use of definite articles used to intro duce claim recitations. in addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense of one having skill in the art would understand the convention (e.g., "a system having at least one of A, B, and C" would include but not be limited to systems that have A alone, B alone, C alone, A and B together, A and C together, B and C together, and/or A, B, and C together). in those instances, where a convention analogous to "at least one of A, B, or C, etc." is used, in general such a construction is intended in the sense of one having skill in the art would understand the convention (e.g., "a system having at least one of A, B, or C" would include but not be limited to systems that have A alone, B alone, C alone, A and B together, A and C together, B and C together, and/or A, B, and C together).

Conditional language used herein, such as, among others, "can," "may," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without other input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

While the phrase "click" may be used with respect to a user selecting a control, menu selection, or the like, other user inputs may be used, such as voice commands, text entry, gestures, etc. User inputs may, by way of example, be provided via an interface or in response to a prompt (e.g., a voice or text prompt). By way of example an interface may include text fields, wherein a user provides input by entering text into the field. By way of further example, a user input may be received via a menu selection (e.g., a drop down menu, a list or other arrangement via which the user can check via a check box or otherwise make a selection or selections, a group of individually selectable icons, a menu selection made via an interactive voice response system, etc.). When the user provides an input or activates a control, a corresponding computing system may perform a corresponding operation (e.g., store the user input, process the user input, provide a response to the user input, etc.). Some or all of the data, inputs and instructions provided by a user may optionally be stored in a system data store (e.g., a database), from which the system may access and retrieve such data, inputs, and instructions. The notifications and user interfaces described herein may be provided via a Web page, a dedicated or non-dedicated phone application, computer application, a short messaging service message (e.g., SMS, MMS, etc.), instant messaging, email, push notification, audibly, and/or otherwise.

The user terminals or devices described herein may be in the form of a mobile communication device (e.g., a cell phone, a VoIP equipped mobile device, etc.), laptop, tablet computer, interactive television, game console, media streaming device, head-wearable display, virtual reality display/headset, augmented reality display/headset, networked watch, etc. The user terminals may optionally include displays, user input devices (e.g., touchscreen, keyboard, mouse, voice recognition, etc.), network interfaces, etc.

While the above detailed description has shown, described, and pointed out novel features as applied to various embodiments, it can be understood that various omissions, substitutions, and changes in the form and details of the devices or algorithms illustrated can be made without departing from the spirit of the disclosure. As can be recognized, certain embodiments described herein can be embodied within a form that does not provide all of the features and benefits set forth herein, as some features can be used or practiced separately from others.

Although the present invention has been described in terms of the presently preferred embodiment, it is to be understood that the disclosure is not to be interpreted as limiting. Various alterations and modifications will no doubt become apparent to one skilled in the art after reading the above disclosure. accordingly, it is intended that the appended claims be interpreted as covering all alterations and modifications as fall within the true spirit and scope of the invention.

What is claimed is:

1. A networked music instrument system, comprising:
   a network interface;
   a computing device; and
   non-transitory memory that stores program instructions that, when executed by the computing device, cause the networked music instrument system to perform operations comprising:
      transmitting musical instrument digital commands of a first electronic instrument, associated with a first user, for a first item of music over a network using the network interface to a plurality of electronic instruments, remote from the first electronic instrument, associated with a first plurality of respective users for reproduction, at a same time, by respective remote electronic instruments in the plurality of electronic instruments;
      setting, in response to detecting a key range command, a key range for at least one of the plurality of remote electronic instruments comprising a lowest note boundary and a highest note boundary;
      causing, in response to detecting a transpose command, a transposition of at least a portion of the first item of music to a first key to be performed on at least one of the plurality of remote electronic instruments;

muting audio of a portion of the first plurality of respective users, wherein audio of a second user in the first plurality of respective users is not muted; and enabling audio of the second user to be streamed over the network to respective devices of the first user and devices of the portion of the first plurality of respective users.

2. The networked music instrument system as defined in claim 1, further comprising:

detecting a music change command from the first user, wherein the music change command comprises at least one of a key change command, tempo change command, play command, an intensity change command, pause command, stop command, fast forward command, resume command, repeat command, style command, duration command, or automated direction command; and transmitting the music change command to one or more of the plurality of remote electronic instruments.

3. The networked music instrument system as defined in claim 1, wherein at least one of the plurality of remote electronic instruments is associated with a respective computing device, a microphone, and a speaker.

4. The networked music instrument system as defined in claim 1, the operations further comprising transmitting instructions to one or more of the respective users of the plurality of remote electronic instruments, the instructions related to performance of a vowel, a consonant, an intensity or a volume.

5. The networked music instrument system as defined in claim 1, the operations further comprising performing an analysis of a vocal exercise to determine a respective absolute key, a tempo, an order of vocal exercise progression, a vocal concept, a vocal cause and effect, a vowel selection, a phoneme, and/or a vocal fault.

6. The networked music instrument system as defined in claim 1, the operations further comprising causing music notation currently playing indicators displayed by the first electronic instrument and at least a portion of the plurality of remote electronic instruments to be synchronized.

7. The networked music instrument system as defined in claim 1, the operations further comprising enabling a live stream feed of audio and video of multiple users singing and/or playing respective electronic instruments to be live streamed to respective devices of a plurality of users.

8. The networked music instrument system as defined in claim 1, the operations further comprising:

conducting a video conference in full duplex mode between the first user and a second user local to a second electronic instrument while the first item of music is reproduced by the second electronic instrument.

9. The networked music instrument system as defined in claim 1, the operations further comprising:

conducting a video conference between the first user local to the first electronic instrument and at least one other user local to a remote electronic instrument in the plurality of remote electronic instruments while the first item of music is reproduced by the remote electronic instrument;

generating and providing for display a user interface, the user interface:
depicting notes of the first item of music;
displaying an image corresponding to the first electronic instrument; and
displaying an animation of key presses corresponding to the notes of the first item of music using the image corresponding to the first electronic instrument.

10. The networked music instrument system as defined in claim 1, the operations further comprising:

enabling a live stream feed of audio and video of multiple users singing and/or playing respective electronic instruments to be live streamed to respective devices of a plurality of users; and conducting a video conference in full duplex mode between the first user and a second user local to a second electronic instrument while the first item of music is reproduced by the second electronic instrument.

11. The networked music instrument system as defined in claim 1, the operations further comprising:

enabling a live stream feed of audio and video of multiple users singing and/or playing respective electronic instruments to be live streamed to respective devices of a plurality of users; and conducting a video conference between the first user local to the first electronic instrument and at least one other user local to a remote electronic instrument in the plurality of remote electronic instruments while the first item of music is reproduced by the remote electronic instrument;

generating and providing for display a user interface, the user interface:
depicting notes of the first item of music;
displaying an image corresponding to the first electronic instrument; and
displaying an animation of key presses corresponding to the notes of the first item of music using the image corresponding to the first electronic instrument.

12. The networked music instrument system as defined in claim 1, wherein detecting the transpose command further comprises detecting a predefined pattern, tempo variation, chord combination, or triad combination.

13. The networked music instrument system as defined in claim 1, wherein the transpose command is received from a user of the at least one of the plurality of remote electronic instruments or from the first electronic instrument.

14. The networked music instrument system as defined in claim 1, the operations further comprising:

enabling a user to specify a range command by specifying:
range boundary keys comprising:
a highest note played, and
a lowest note played;
at least one of an ascending key direction command or a descending key direction command;
an interval;

transmitting a user specified range command to at least one electronic instrument to cause the at least one electronic instrument to play at least one item of music in the specified ascending or descending direction in accordance with the specified interval until a corresponding range boundary key is reached.

15. A computer-implemented method, the method comprising:

transmitting musical instrument digital commands of a first electronic instrument, associated with a first user, for a first item of music over a network to a plurality of devices comprising or connected to electronic instruments associated with a first plurality of respective users for reproduction, at a same time, by respective remote electronic instruments in the plurality of remote electronic instruments;

setting, in response to detecting a key range command, a key range for at least one of the plurality of remote electronic instruments comprising a lowest note boundary and a highest note boundary;

causing, in response to detecting a transpose command, a transposition of at least a portion of the first item of music to a first key to be performed on at least one of the plurality of remote electronic instruments;

muting audio of a portion of the first plurality of respective users, the portion comprising at least a second user; and enabling audio of the second user to be streamed over the network to respective devices of the first user and devices of the portion of the first plurality of respective users.

16. The computer-implemented method as defined in claim 15, the method further comprising:

detecting a music change command from the first user, wherein the music change command comprises at least one of a key change command, tempo change command, play command, an intensity change command, pause command, stop command, fast forward command, resume command, repeat command, style command, duration command, or automated direction command; and transmitting the music change command to one or more of the plurality of devices.

17. The computer-implemented method as defined in claim 15, the method further comprising causing music notation currently playing indicators displayed by the first electronic instrument and at least a portion of the plurality of remote electronic instruments to be synchronized.

18. The computer-implemented method as defined in claim 15, the method further comprising enabling a live stream feed of audio and video of multiple users singing and/or playing respective electronic instruments to be live streamed to respective devices of a plurality of users.

19. The computer-implemented method as defined in claim 15, the method further comprising:

conducting a video conference in full duplex mode between the first user and a second user local to a second electronic instrument while the first item of music is reproduced by the second electronic instrument.

20. The computer-implemented method as defined in claim 15, the method further comprising:

conducting a video conference between the first user local to the first electronic instrument and at least one other user local to a remote electronic instrument in the plurality of remote electronic instruments while the first item of music is reproduced by the remote electronic instrument;

generating and providing for display a user interface, the user interface:

depicting notes of the first item of music;

displaying an image corresponding to the first electronic instrument; and displaying an animation of key presses corresponding to the notes of the first item of music using the image corresponding to the first electronic instrument.

21. The computer-implemented method as defined in claim 15, the method further comprising:

enabling a live stream feed of audio and video of multiple users singing and/or playing respective electronic instruments to be live streamed to respective devices of a plurality of users; and conducting a video conference in full duplex mode between the first user and a second user local to a second electronic instrument while the first item of music is reproduced by the second electronic instrument.

22. The computer-implemented method as defined in claim 15, the method further comprising:

enabling a live stream feed of audio and video of multiple users singing and/or playing respective electronic instruments to be live streamed to respective devices of a plurality of users; and conducting a video conference between the first user local to the first electronic instrument and at least one other user local to a remote electronic instrument in the plurality of remote electronic instruments while the first item of music is reproduced by the remote electronic instrument;

generating and providing for display a user interface, the user interface:

depicting notes of the first item of music;

displaying an image corresponding to the first electronic instrument; and displaying an animation of key presses corresponding to the notes of the first item of music using the image corresponding to the first electronic instrument.

23. The computer-implemented method as defined in claim 15, wherein the transpose command is received from a user of the at least one of the plurality of remote electronic instruments or from the first electronic instrument.

24. A non-transitory memory that stores program instructions that, when executed by a computing device, cause the computing device to perform operations comprising:

transmitting musical instrument digital commands of a first electronic instrument, associated with a first user, for a first item of music over a network to a plurality of devices comprising or connected to electronic instruments associated with a first plurality of respective users for reproduction, at a same time, by respective remote electronic instruments in the plurality of remote electronic instruments;

setting, in response to detecting a key range command, a key range for at least one of the plurality of remote electronic instruments comprising a lowest note boundary and a highest note boundary;

causing, in response to detecting a transpose command, a transposition of at least a portion of the first item of music to a first key to be performed on at least one of the plurality of remote electronic instruments;

muting audio of a portion of the first plurality of respective users, the portion comprising at least a second user; and enabling audio of the second user to be streamed over the network to respective devices of the first user and devices of the portion of the first plurality of respective users.

25. The non-transitory memory as defined in claim 24, the operations further comprising enabling a live stream feed of audio and video of multiple users singing and/or playing respective electronic instruments to be live streamed to respective devices of a plurality of users.

26. The non-transitory memory as defined in claim 24, the operations further comprising:

conducting a video conference in full duplex mode between the first user and a second user local to a second electronic instrument while the first item of music is reproduced by the second electronic instrument.

27. The non-transitory memory as defined in claim 24, the operations further comprising:
   conducting a video conference between the first user local to the first electronic instrument and at least one other user local to a remote electronic instrument in the plurality of remote electronic instruments while the first item of music is reproduced by the remote electronic instrument;
   generating and providing for display a user interface, the user interface:
      depicting notes of the first item of music;
      displaying an image corresponding to the first electronic instrument; and
      displaying an animation of key presses corresponding to the notes of the first item of music using the image corresponding to the first electronic instrument.

28. The non-transitory memory as defined in claim 24, the operations further comprising:
   enabling a live stream feed of audio and video of multiple users singing and/or playing respective electronic instruments to be live streamed to respective devices of a plurality of users; and
   conducting a video conference in full duplex mode between the first user and a second user local to a second electronic instrument while the first item of music is reproduced by the second electronic instrument.

29. The non-transitory memory as defined in claim 24, the operations further comprising:
   enabling a live stream feed of audio and video of multiple users singing and/or playing respective electronic instruments to be live streamed to respective devices of a plurality of users; and
   conducting a video conference between the first user local to the first electronic instrument and at least one other user local to a remote electronic instrument in the plurality of remote electronic instruments while the first item of music is reproduced by the remote electronic instrument;
   generating and providing for display a user interface, the user interface:
      depicting notes of the first item of music;
      displaying an image corresponding to the first electronic instrument; and
      displaying an animation of key presses corresponding to the notes of the first item of music using the image corresponding to the first electronic instrument.

* * * * *